US012670290B2

(12) United States Patent
Qiao et al.

(10) Patent No.: US 12,670,290 B2
(45) Date of Patent: Jun. 30, 2026

(54) SECURE STORAGE AND MAINTENANCE OF POTENTIALLY SENSITIVE FILE DOWNLOADS

(71) Applicant: Citrix Systems, Inc., Fort Lauderdale, FL (US)

(72) Inventors: Zongpeng Qiao, Nanjing (CN); Jia Yin, Nanjing (CN); Li Qiming, Nanjing (CN); Jinming Zhao, Nanjing (CN)

( * ) Notice: Subject to any disclaimer, the term of this patent is extended or adjusted under 35 U.S.C. 154(b) by 359 days.

(21) Appl. No.: 17/878,284

(22) Filed: Aug. 1, 2022

(65) Prior Publication Data

US 2024/0012932 A1 Jan. 11, 2024

Related U.S. Application Data

(63) Continuation of application No. PCT/CN2022/104856, filed on Jul. 11, 2022.

(51) Int. Cl.
*G06F 21/62* (2013.01)

(52) U.S. Cl.
CPC ................................. *G06F 21/6245* (2013.01)

(58) Field of Classification Search
None
See application file for complete search history.

(56) References Cited

U.S. PATENT DOCUMENTS

| | | | | |
|---|---|---|---|---|
| 2010/0174804 | A1* | 7/2010 | Sonoyama | .......... H04L 67/1095 709/224 |
| 2013/0145085 | A1* | 6/2013 | Yu | ........................ G06F 12/0246 711/103 |
| 2015/0106946 | A1* | 4/2015 | Soman | .................. G06F 21/602 726/26 |
| 2015/0332051 | A1 | 11/2015 | Ech-Chergui et al. | |
| 2016/0357978 | A1* | 12/2016 | Lin | ..................... G06F 21/6272 |
| 2018/0114033 | A1* | 4/2018 | Mathur | .............. G06F 21/6227 |
| 2019/0087596 | A1* | 3/2019 | Lin | ........................ G06F 16/122 |
| 2020/0004839 | A1 | 1/2020 | Naravenekar | |
| 2020/0145515 | A1* | 5/2020 | Fleck | ...................... H04L 67/30 |
| 2021/0194888 | A1* | 6/2021 | Bhaskar S | .......... G06F 16/3347 |
| 2022/0012070 | A1* | 1/2022 | Azulay | ................... G06F 9/451 |
| 2022/0141281 | A1* | 5/2022 | Ramamoorthy | .... H04L 63/0876 709/219 |
| 2022/0294831 | A1* | 9/2022 | Narayanaswamy | .. H04L 63/104 |
| 2023/0016018 | A1* | 1/2023 | Agarwal | ............. H04L 63/0236 |

FOREIGN PATENT DOCUMENTS

| | | |
|---|---|---|
| CN | 111241565 A | 6/2020 |
| CN | 111404706 A | 7/2020 |

OTHER PUBLICATIONS

International Search Report and Written Opinion issued Dec. 26, 2022 for International Patent Application No. PCT/CN2022/104856.

* cited by examiner

*Primary Examiner* — Joshua Joo

(57) ABSTRACT

One disclosed method involves detecting a request to download a file, via a network, to a first storage medium associated with a client device, and determining that the file is potentially sensitive. The method further involves initiating a process to download the file to a second storage medium rather than the first storage medium based at least in part on the file being potentially sensitive.

20 Claims, 24 Drawing Sheets

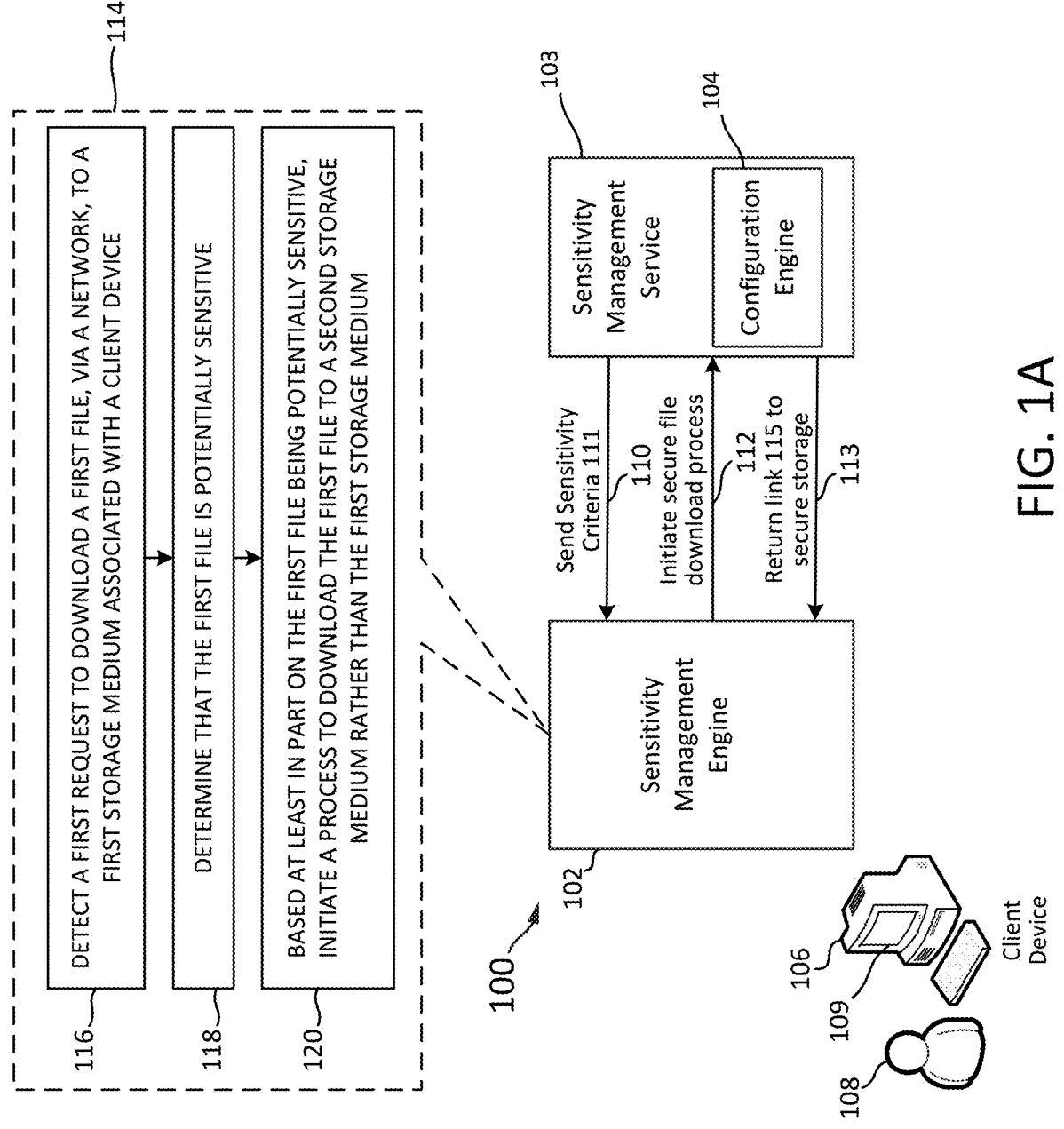

114

116  DETECT A FIRST REQUEST TO DOWNLOAD A FIRST FILE, VIA A NETWORK, TO A FIRST STORAGE MEDIUM ASSOCIATED WITH A CLIENT DEVICE

118  DETERMINE THAT THE FIRST FILE IS POTENTIALLY SENSITIVE

120  BASED AT LEAST IN PART ON THE FIRST FILE BEING POTENTIALLY SENSITIVE, INITIATE A PROCESS TO DOWNLOAD THE FIRST FILE TO A SECOND STORAGE MEDIUM RATHER THAN THE FIRST STORAGE MEDIUM

103  Sensitivity Management Service

104  Configuration Engine

102  Sensitivity Management Engine

Send Sensitivity Criteria 111

110  Initiate secure file download process

112  Return link 115 to secure storage

113

100

106

109

108

Client Device

FIG. 1A

| Entry ID | Sensitive Domain | Time To Delete |
|---|---|---|
| 0001 | ExampleURL.com | 7 Days |
| 0002 | Company.Payroll.com | 5 Days |
| 0003 | Company.HR.com | 5 Days |
| | | |
| | | |
| | | |

Sensitive Domain List

800

| Entry ID | Sensitive Keyword | Time To Delete |
|----------|-------------------|----------------|
| 0001 | Payroll | 5 Days |
| 0002 | Retirement | 5 Days |
| 0003 | Tax | 7 Days |
| 0004 | Confidential | 3 Days |
| 0005 | Privileged | 3 Days |
| 0006 | SSN | 1 Day |

802   804   806

Sensitive Keyword List

FIG. 8

| Entry ID | File ID | Source ID | Last Accessed | Time to Delete |
|---|---|---|---|---|
| 0001 | FileNameA | SourceA | 1/1/2022 1:11 PM | 3 Days |
| 0002 | FileNameB | SourceB | 1/4/2022 2:22 PM | 5 Days |
| 0003 | Example File A | ExampleURL.com | 1/7/2022 3:33 PM | 7 Days |
| | | | | |
| | | | | |
| | | | | |
| | | | | |
| | | | | |

902    904    906    908    910

Sensitive File Observation List

900

1000

| Entry ID | File ID | File Deleted Indicator | Timestamp |
|---|---|---|---|
| 0001 | FileNameA | False | 2/3/2022 2:22 PM |
| 0002 | FileNameB | True | 2/5/2022 4:45 PM |
| 0003 | Example File A | False | 2/8/2022 6:00 PM |
| | | | |
| | | | |
| | | | |
| | | | |
| | | | |

1002     1004     1006     1008

File Action Table

FIG. 10

SECURE STORAGE AND MAINTENANCE OF POTENTIALLY SENSITIVE FILE DOWNLOADS

CROSS-REFERENCE TO RELATED APPLICATIONS

This application is a continuation of and claims the benefit under 35 U.S.C. § 120 and U.S.C. § 365(c) to International Application PCT/CN2022/104856, entitled SECURE STORAGE AND MAINTENANCE OF POTENTIALLY SENSITIVE FILE DOWNLOADS, with an international filing date of Jul. 11, 2022, the entire contents of which are incorporated herein by reference for all purposes.

BACKGROUND

Various systems have been developed that allow client devices to access applications and/or data files over a network. Certain products offered by Citrix Systems, Inc., of Fort Lauderdale, FL, including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises detecting a first request to download a first file, via a network, to a first storage medium associated with a client device; determining that the first file is potentially sensitive; and based at least in part on the first file being potentially sensitive, initiating a process to download the first file to a second storage medium rather than the first storage medium.

In some embodiments, a computing system comprises at least one processor, and at least one computer-readable medium encoded with instructions which, when executed by the at least one processor, cause the computing system to detect a first request to download a first file, via a network, to a first storage medium associated with a client device, to determine that the first file is potentially sensitive, and based at least in part on the first file being potentially sensitive, to initiate a process to download the first file to a second storage medium rather than the first storage medium.

In some embodiment, at least one non-transitory computer-readable medium is encoded with instructions which, when executed by at least one processor of a computing system, cause the computing system to detect a first request to download a first file, via a network, to a first storage medium associated with a client device, to determine that the first file is potentially sensitive, and, based at least in part on the first file being potentially sensitive, to initiate a process to download the first file to a second storage medium rather than the first storage medium.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1A shows an example system configured to provide secure storage and maintenance of potentially sensitive file downloads in accordance with some aspects of the present disclosure;

FIG. 8 shows an example sensitive keyword list in accordance with some aspects of the present disclosure;

FIG. 10 shows an example file action table in accordance with some aspects of the present disclosure;

DETAILED DESCRIPTION

Figure 1B:
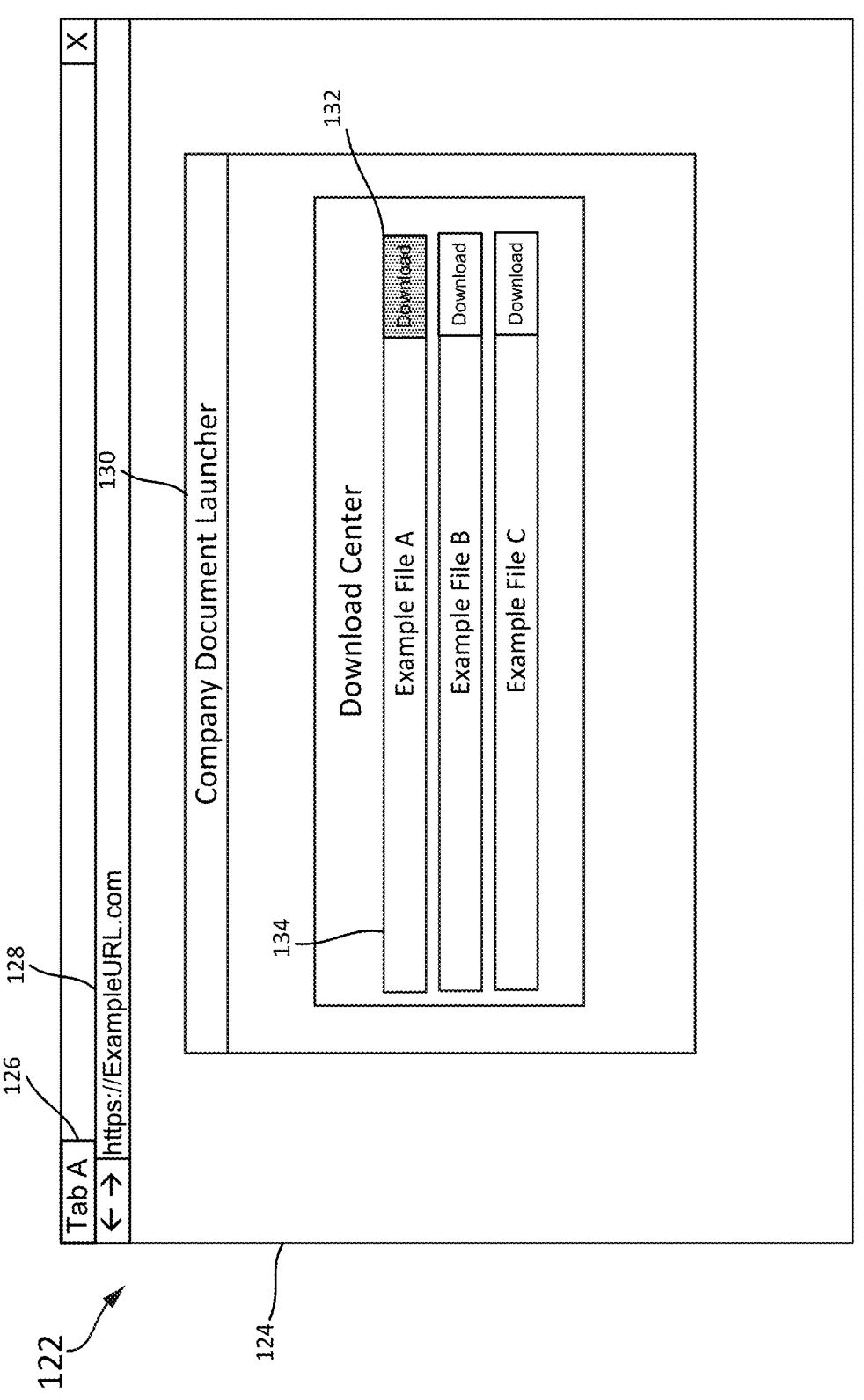
FIG. 1B shows a first example display screen of the client device shown in FIG. 1A.

For purposes of reading the description of the various embodiments below, the following descriptions of the sections of the specification and their respective contents may be helpful:

Section A provides an introduction to illustrative example embodiments of a system configured to provide secure storage and maintenance of potentially sensitive file downloads in accordance with some aspects of the present disclosure;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by client devices to a variety of resources;

Section F describes example embodiments of systems for providing file sharing over network(s);

Section G provides a more detailed description of example embodiments of the system introduced in Section A; and Section H describes example implementations of methods, systems/devices, and computer-readable media in accordance with the present disclosure.

A. Introduction to Illustrative Embodiments of a System Configured to Provide Secure Storage and Maintenance of Potentially Sensitive File Downloads Users frequently download files to a local storage of their computing devices. Often, these downloaded files include potentially sensitive (e.g., privileged, confidential, financial, and/or personal) information that a user would not want others to have access to. Further, in some cases, users may download these potentially sensitive files and forget to delete (or otherwise manage) the potentially sensitive files after they serve their purpose. Forgetting to delete (or otherwise manage) potentially sensitive files, such that they remain in the local storage of the computing device, may leave the potentially sensitive files unprotected and vulnerable to access by others (e.g., a third party accessing the files using the computing device or using malicious software).

Offered are systems and techniques for detecting that a user is attempting to download a potentially sensitive file and providing the user with an option to download the file to a secure storage medium. Further, if the user elects to not download the potentially sensitive file to the secure storage medium, systems and techniques for keeping track of and maintaining the potentially sensitive file in a local storage of a computing device are provided, such that the user may receive a notification to delete or otherwise manage the potentially sensitive file if the potentially sensitive file remains unmanaged in the local storage of the computing device for a certain amount of time. In some implementations, a sensitivity management engine may be used to detect that a user is attempting to download the potentially sensitive file and provide the user with an option to download the file to the secure storage medium. Advantageously, by utilizing the sensitivity management engine to detect whether a file to be downloaded is potentially sensitive, a user may be prompted with an option to download the file to the secure storage medium only when the file is potentially sensitive. Therefore, the user will not be prompted with an option to download every file to the secure storage medium regardless of the potential sensitivity of the file. Further, in some implementations, by providing the user with an option to download the potentially sensitive file to the secure storage medium, the user need only accept the option and the sensitivity management engine may handle the downloading of the potentially sensitive file to the secure storage medium without further input by the user. Even further, in some implementations, if the user declines the option to download the potentially sensitive file to the secure storage medium, the sensitivity management engine may provide monitoring of the file while it exists in the local storage of the user's device and may prompt the user to perform an action on the file if it exists for a certain amount of time without being modified or deleted.

FIG. 1A shows an example system 100 configured to provide secure storage and maintenance of potentially sensitive file downloads. As shown, in some implementations, the system 100 may include a sensitivity management engine 102 in communication with a sensitivity management service 103 (which may include a configuration engine 104) to enable detection of attempted downloads of sensitive files to a client device 106. The client device 106 may, for example, correspond to any one of the clients 202 described in Sections B through F below. In some implementations, as illustrated, the sensitivity management engine 102 may be configured to perform a routine 114. FIGS. 1B-1F show example screens 122, 136, 146, 172, and 182, respectively, of the client device 106 as the sensitivity management engine 102 performs the steps of the routine 114.

As shown in FIG. 1B, a display 109 (see FIG. 1A) of the client device 106 may be presenting (as the screen 122) a particular web page in a web browsing application (e.g., a web browser) 124. In some implementations, the sensitivity management engine 102 may be an extension (e.g., an add-on or plug-in) of the web browser 124. In some implementations, the web browser 124 may be a specialized browser that is embedded in a resource access application 522 (when the resource access application 522 is installed on the client 202) or provided by one of the resource feeds 504 (when the resource access application 522 is located remotely), e.g., via a secure browser service, as described below in connection with FIGS. 5A-C.

As also shown, the web browser 124 may present a web page 126 ("Tab A" in the illustrated example) and a web page address bar 128 (populated with "https://ExampleU-RL.com" in the illustrated example) representing the web page address of the web page 126 currently displayed on the screen 122. As also shown, the web page 126 may identify downloadable documents. For example, as shown in FIG. 1B, a window 130 of the web page 126 may include a selectable download button 132 to initiate a download of a file 134 ("Example File A" in the illustrated example).

As shown in FIG. 1A, as indicated by an arrow 110, the sensitivity management engine 102 may receive sensitivity criteria 111 from the sensitivity management service 103. In some implementations, the sensitivity management service 103 may be located remotely from the client device 106 and communicate with the client device 106 over a network. For instance, in some implementations, the sensitivity management service 103 may be included amongst the resource management services 502 described in Section E in connection with FIGS. 5A-D. In some implementations the sensitivity criteria 111 may include a sensitive domain list (described in detail below in connection with FIG. 7), a sensitive keyword list (described in detail below in connection with FIG. 8), and a sensitive file observation list (described in detail below in connection with FIG. 9). The sensitivity management service 103 may send the sensitivity criteria 111 to the sensitivity management engine 102, for example, upon launching of the web browser 124. In some implementations, the sensitivity management service 103 may send 110 the sensitivity criteria 111 to the sensitivity management engine 102 in response to receipt of a query for the sensitivity criteria 111 from the sensitivity management engine 102.

As also shown in FIG. 1A, in some implementations, the routine 114 may begin at a step 116, when the sensitivity management engine 102 detects a first request to download a first file, via a network, to a first storage medium associated with a client device (e.g., a local storage of the client device 106). For example, as illustrated in FIG. 1B, a user 108 may operate the client device 106 to attempt to initiate a download of the file 134 to the client device 106, such as by clicking on or otherwise selecting the download button 132. The user 108 may attempt to initiate the download of the file 134 using the web browser 124. The web browser 124 may be a web browsing application such as Microsoft Edge, Mozilla Firefox, Apple Safari, Google Chrome, etc. As noted above, in some implementations, the web browser 124 may include a browser extension that embodies the sensitivity management engine 102. In some implementations, the sensitivity management engine 102 may detect the request to download the file 134 to the first storage medium using an event handler. For example, the sensitivity management engine 102 may register for an event handler associated with the initiation of a download using the web browser 124, such that, when the user initiates a download of the file 134, the sensitivity management engine 102 may receive an event notification that the user 108 has attempted to initiate a download of the file 134. In some implementations, the sensitivity management engine 102 may halt (or postpone) the download of the file 134 and proceed to a step 118 of the routine 114.

At the step 118 of the routine 114, the sensitivity management engine 102 may determine that the first file (e.g., the file 134) is potentially sensitive. In some implementations, the sensitivity management engine 102 may automatically determine whether the file 134 is potentially sensitive in response to detecting the user 108 has attempted to download the file 134. In some implementations, the sensitivity management engine 102 may be manually caused to determine if the file 134 is potentially sensitive. For example, a user 108 may, before downloading the file 134, select the file 134 with a secondary input action button (e.g., a long press, a right-click, etc.) to access an options drop-down menu including a manual option to cause the sensitivity management engine 102 to determine whether the file 134 is potentially sensitive. In some implementations, the user 108 may configure user preferences associated with the sensitivity management engine 102 to select whether the user 108 wants the sensitivity management engine 102 to automatically determine whether a file is potentially sensitive or whether the user 108 only wants the sensitivity management engine 102 to determine the sensitivity of a file through manual activation by the user 108.

In some implementations, the sensitivity management engine 102 may determine that the file 134 is potentially sensitive using the sensitivity criteria 111 received from the sensitivity management service 103. In some implementations, the sensitivity management engine 102 may determine that the file 134 is potentially sensitive based on at least one of the sensitive domain list or the sensitive keyword list. For example, with respect to the sensitive domain list, the sensitivity management engine 102 may determine that a domain associated with a web page (e.g., the entry of the web page address bar 128) "ExampleURL.com" is potentially sensitive based on the domain "ExampleURL.com" matching an entry in the sensitive domain list. Techniques for determining whether the web page matches a potentially sensitive domain are described herein below with respect to FIG. 7. For further example, with respect to the sensitive keyword list, the sensitivity management engine 102 may determine that data or metadata associated with the file 134 is indicative of the file 134 being potentially sensitive based on the data/metadata matching keywords in the sensitive keyword list. In some implementations, the data/metadata associated with the file 134 may include the file name and/or the contents of the file 134. For example, the sensitivity management engine 102 may determine that metadata corresponding to the file 134 includes a file name of "John Smith Pay Stub," and, based on the determining that "Pay Stub" is represented in the sensitive keyword list, the sensitivity management engine 102 may determine that the file 134 is potentially sensitive. In some implementations, the sensitive keyword list may include patterns that are associated with potentially sensitive information (e.g., a social security number (SSN) being associated with XXX-XX-XXXX). For example, in some implementations, the sensitivity management engine 102 may have access to the file 134 such that the sensitivity management engine 102 may determine if the file 134 contains information that matches the patterns included in the sensitive keyword list in order to determine whether the file 134 may be potentially sensitive. Techniques for determining whether the file matches a potentially sensitive keyword are described below with reference to FIG. 8.

Figure 1C:
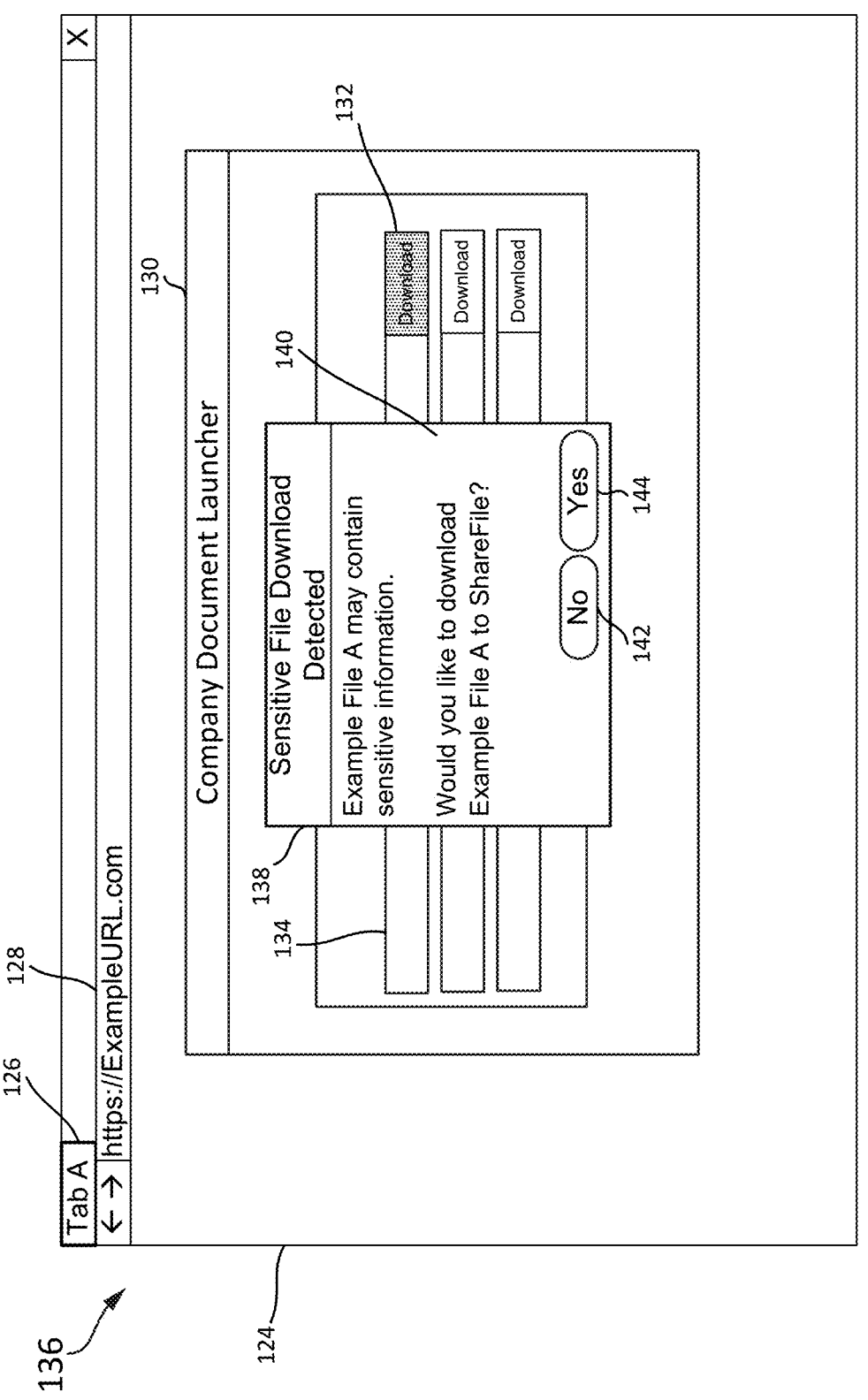
FIG. 1C shows a second example display screen of the client device shown in FIG. 1A.

At a step 120 of the routine 114, the sensitivity management engine 102 may, based at least in part on the first file (e.g., the file 134) being potentially sensitive, initiate a process to download the first file (e.g., the file 134) to a second storage medium (e.g., a secure storage) rather than the first storage medium (e.g., the local storage of the client device 106) (as indicated by the arrow 112 in FIG. 1A). In some implementations, the sensitivity management engine 102 may initiate such a process by informing the user 108 about the potential sensitivity of the file 134 and providing an option (e.g., a prompt 138) to download the file 134 to the second storage medium (as illustrated in FIG. 1C). The file sharing system 604 described below in Section F is an example of a secure storage system that may be employed as the second storage medium described herein. As Section F describes in connection with FIGS. 6A-C, authorized clients

202 may be permitted to interact with an access management system 606 of the file sharing system 604 to obtain an "upload token" identifying a destination folder for the file on a storage system 608, and may then use that upload token to upload the file 134 to the storage system 608. As explained in more detail below, in some implementations, the sensitivity management engine 102 may send a request to a "microapp" that is configured to perform those steps on behalf of the user 108. In particular, the sensitivity management engine 102 may send a request to such a microapp that identifies the source location (e.g., a Uniform Resource Locator (URL)) of the file 134, and the recipient microapp may then download the file 134 from the identified location, use access credentials associated with the user 108 to obtain an upload token from the access management system 604, and then use that upload token to upload the file 134 to an appropriate destination folder in the storage system 608. As also described in more detail below, in some implementations, the microapp may further interact with the access management system 606 to obtain an "access token" for the file 134 on the storage system 608, and return that access token to the sensitivity management engine 102, so as to enable the user 108 to use that access token to access the file 134 via the storage system 608 (e.g., by clicking on a link that includes the access token).

FIG. 1C shows an example screen 136 that includes an example prompt 138, where, in response to the sensitivity management engine 102 detecting that the user 108 has attempted to download the file 134 to the first (local) storage medium and the sensitivity management engine 102 determining that the file 134 is potentially sensitive, the sensitivity management engine 102 causes the web browser 124 to present the prompt 138 on the display 109 of the client device 106. In some implementations, the prompt 138 may include text 140 indicating, for example, that the file 134 may include sensitive information and presenting an option to download the file 134 to the second (secure) storage medium. As shown in FIG. 1C, in some implementations, the prompt 138 may include a "yes" button 144 and a "no" button 142. If the sensitivity management engine 102 detects that the user 108 has selected the "yes" button 144, then the sensitivity management engine 102 may initiate the process to download the file 134 to the second (secure) storage medium rather than the first (local) storage medium.

In some implementations, in response to initiating the process to download the file 134 to the second (secure) storage medium, the sensitivity management service 103 may cause the display 109 of the client device 106 to present a login screen for the second storage medium. For example, in order for the sensitivity management engine 102 to send a request to a microapp configured to perform the process to download the file 134 to the second storage medium, the sensitivity management service 103 may require the user 108 to enter the user's 108 login credentials for the second storage medium. In other implementations, the user 108 may instead be prompted to enter login credentials for a single sign-on (SSO) service that manages access to the second storage medium, among other resources. For example, in some implementations, the user 108 may be required to authenticate to an identity service 516 (described below in connection with FIG. 5B) prior to enabling a microapp to interact with the second storage medium on behalf of the user 108. In some implementations, e.g., if the user 108 has previously authenticated to the second storage medium and/or a SSO service and that access is determined to still be valid (e.g., has not expired), then the sensitivity management service 103 may not require the user 108 to complete the login request. For example, if the web browser 124 is a specialized browser included in a resource access application 522, the user 108 may have used the resource access application 522 to authenticate to the identity service 516 prior to gaining access to the web browser 124 and such SSO authentication may be adequate to enable a microapp to interact with the second storage medium (e.g., the file sharing system 604 shown in FIGS. 6A-C) on behalf of the user 108.

In some implementations, the process to download the file 134 to the second storage medium (e.g., the file sharing system 604) may include sending a hyperlink (link) corresponding to the source location of the file 134 to the sensitivity management service 103. For example, when the user 108 selects the download button 132 to download the file, the sensitivity management engine 102 may determine the link associated with the download request of the file 134 and send the link to the sensitivity management service 103.

In some implementations, the sensitivity management engine 102 may initiate the process to download the file 134 to the second storage medium using a microapp (e.g., included within the sensitivity management service 103). For example, the sensitivity management engine 102 may generate a microapp action representing the download request and including the link and send the microapp action to a microapp (e.g., included within the sensitivity management service 103) that is configured to interact with the second storage medium (e.g., the file sharing system 604) on behalf of the user 108. In some implementations, the sensitivity management engine 102 may include the login credentials for the website in the microapp action. The microapp may be configured to receive the link and download the file 134 to the second storage medium (e.g., the file sharing system 604). For example, if the sensitivity management engine 102 sends a microapp action representing the download request and including the link to the file 134, then the microapp service 528 (shown in FIG. 5C) may receive the microapp action and cause a microapp to perform the action (i.e., download the file 134 to the second storage medium). In some implementations, for example, the microapp may download the file 134 using the link for the file 134 and (potentially) the log-in credentials for the website, transfer the file 134 to the second storage medium (e.g., the file sharing system 604), and return a link 115 to the file 134 in the second storage medium to the client device 106 (as indicated by the arrow 113 in FIG. 1A). Microapps and the microapp service 528 are described in more detail herein below with respect to FIGS. 5A-5C.

In some implementations, the microapp may upload the file 134 to the second storage medium in response to receiving an upload token from the access management system 606 (e.g., included within the sensitivity management service 103). As mentioned above, the microapp may use access credentials associated with the user 108 to obtain the upload token from the access management system 606, and use the upload token to upload the file 134 to the second storage medium (e.g., the storage system 608).

The sensitivity management service 103 (e.g., via a microapp) may send the link 115 to the file 134 in the second storage medium to the sensitivity management engine 102 (as illustrated by the arrow 113 illustrated in FIG. 1A). As mentioned above, in some implementations, the link 115 may include an access token for the file 134 obtained from the second storage medium by the microapp. In some implementations, the sensitivity management engine 102 may receive the link 115 to the file 134 in the second storage medium and cause the web browser 124 to present a mechanism for selecting the link 115. In some implementations, the sensitivity management engine 102 may cause the web browser 124 to enable access to the link 115 via a new tab 148 of the web browser 124 (see FIG. 1D). In some implementations, the sensitivity management engine 102 may use the link 115 to access the file 134 and cause the file 134 to be opened in the new tab 148 (see FIG. 1D).

In other implementations, the sensitivity management engine 102 may cause a local agent (e.g., located on the client device 106) (described in further detail below) to upload the file 134 to the second (secure) storage medium. For example, the sensitivity management engine 102 may cause the file 134 to be downloaded to a temporary memory storage (e.g., Random Access Memory (RAM) of the client device 106), rather than downloaded to the first (local) storage medium, and inform the local agent that the file 134 is to be uploaded to the second storage medium. The local agent may access the file 134 in the temporary memory storage, and upload the file 134 to the second storage medium (as described above). In some implementations, if uploading the file 134 to the second storage medium requires access credentials (e.g., in order to receive an upload token from the access management system 606), the local agent may prompt the user 108 to input such access credentials. After uploading the file 134 to the second storage medium, the local agent may receive the link 115 to the file 134 in the second storage medium from the sensitivity management service 103 and provide the link 115 to the sensitivity management engine 102. As discussed above, in some implementations, the sensitivity management engine 102 may use the link 115 to access the file 134 and cause the file 134 to be opened in the new tab 148 (see FIG. 1D).

Figure 1D:
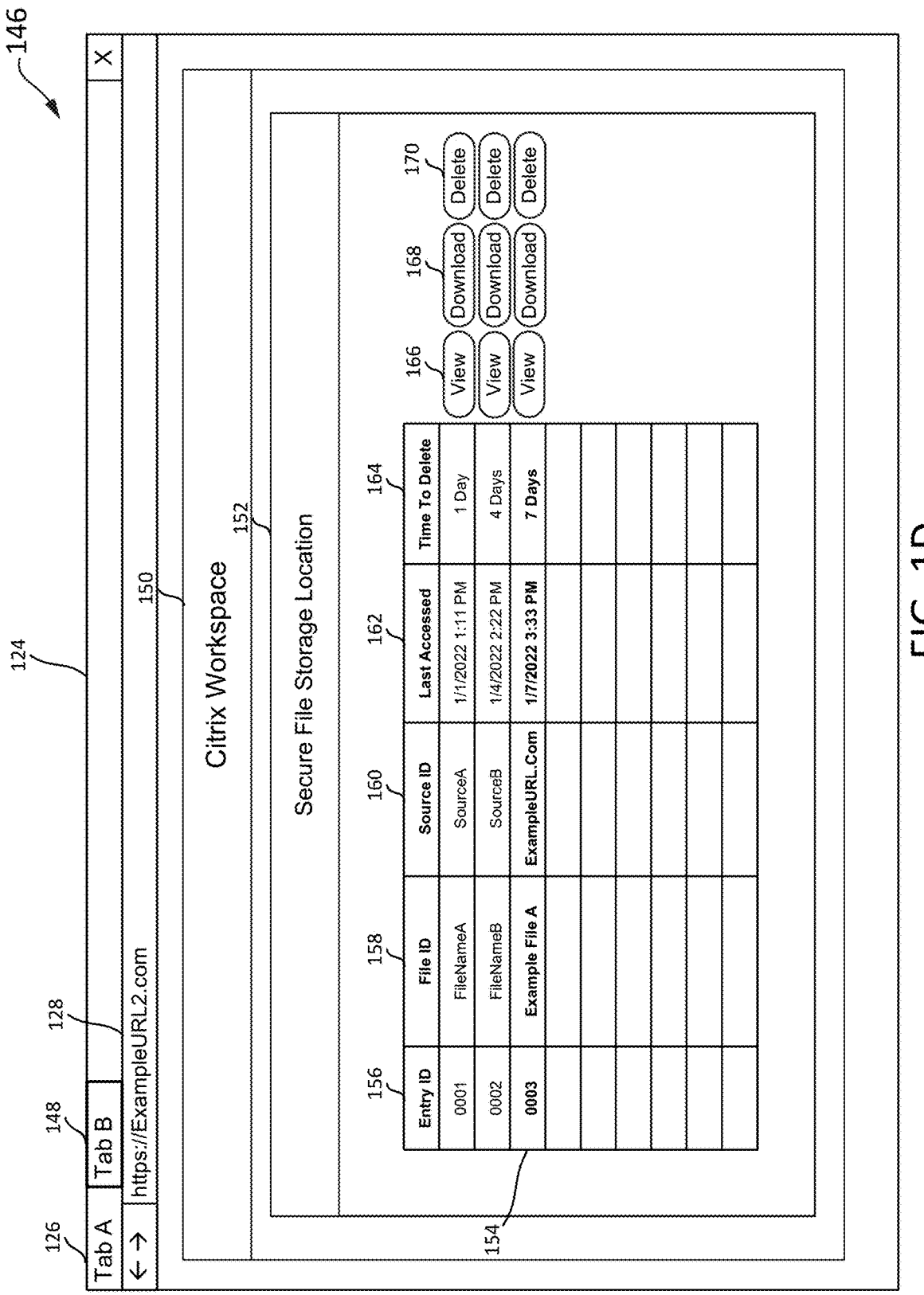
FIG. 1D shows a third example display screen of the client device shown in FIG. 1A.

FIG. 1D shows an example screen 146 of a web page 150 that may enable the user 108 to view and/or access the contents of the second storage medium to which the user 108 has access rights. As shown, the web page 150 may include a window 152 that lists the files that are currently stored in a folder of the second storage medium. For instance, in some implementations, the files the sensitivity management engine 102 causes to be downloaded to the second storage medium may be initially stored in the folder presented in the window 152. As shown in FIG. 1D, the potentially sensitive files the sensitivity management engine 102 causes to be stored in the second storage medium may be listed in a sensitive file table 154, which may include "entry id" entries 156, "file id" entries 158, "source id" entries 160, "last accessed" entries 162, and "time to delete" entries 164.

In some implementations, the "entry id" entries 156 may be unique identifiers assigned by the second storage medium for respective rows of entries in the sensitive file table 154.

In some implementations, the "file id" entries 158 may identify the name of the file that was uploaded to the second storage medium for that row of entries of the sensitive file table 154.

In some implementations, the "source id" entries 160 may identify the web address (e.g., URL) associated with the website that the file was downloaded from.

In some implementations, the "last accessed" entries 162 may be timestamps generated by the second storage medium when the file was uploaded to the second storage medium or last viewed and/or modified by the user 108.

In some implementations, the "time to delete" entries 164 may identify an amount of time (e.g., hours, days, etc.) that the file may exist in the second storage medium without being accessed before the file is deleted from the second storage medium. In some implementations, the sensitivity management service 103 may prompt the user 108 to take an action (e.g., view, modify or delete) with respect to the file in response to determining the file has existed in the second storage medium for an amount of time greater than the "time to delete" entry 164 for the file being managed. For example, the sensitivity management service 103 may cause the web browser 124 to cause the display 109 of the client device 106 to present a prompt requesting that the user 108 take an action with respect to the file. As a further example, the sensitivity management service 103 may prompt the user 108 using some other form of communication (e.g., email, text, etc.).

The sensitive file table 154 may further include a "view" button 166, a "download" button 168, and a "delete" button 170.

In some implementations, the "view" button 166 may be selectable to cause the file of the corresponding row of the sensitive file table 154 to be opened, but not downloaded to the client device 106. For example, in response to selecting the "view" button 166, the file may be opened in an embedded window within the screen 146. In some implementations, in response to selecting the "view" button 166, the client device 106 may obtain an access token for the file from the sensitivity management service 103 for viewing the file. In response to receiving the access token for the file, the access token may be used to view the file.

In some implementations, the "delete" button 170 may be selectable to cause the file identified in the corresponding row of the sensitive file table 154 to be deleted from the second storage medium.

In some implementations, the "download" button 168 may be selectable to cause the file of the corresponding row of the sensitive file table 154 to be downloaded to the first storage medium (e.g., the local storage of the client device 106). In some implementations, in response to selecting the "download" button 168, the client device 106 may obtain a download token for the file 134 from the sensitivity management service 103 for downloading the file 134 from the first storage medium. In some implementations, the sensitivity management service 103 may implement safety measures with respect to allowing a user 108 to download files from the second storage medium to the first storage medium. For example, the sensitivity management service 103 may cause the "download" button 168 to be un-selectable unless user preferences associated with the user's 108 account with the second storage medium are configured to allow files to be downloaded to the first storage medium. As a further example, the sensitivity management service 103 may, in response to determining that the user 108 has selected the "download" button 168, cause the display 109 of the client device 106 to present a prompt (e.g., the prompt 174 in FIG. 1E) warning the user 108 of the sensitivity of the file.

Figure 1E:
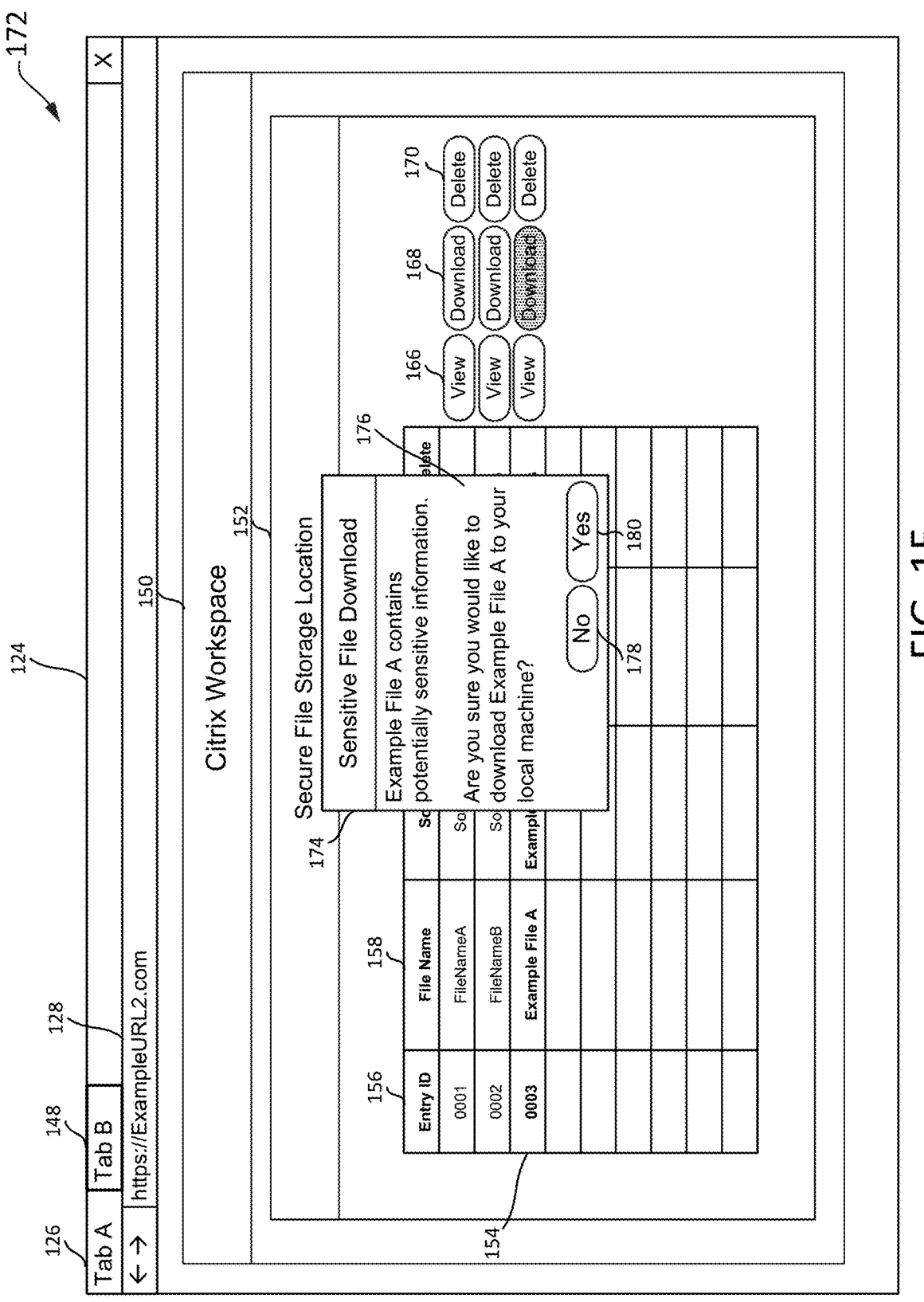
FIG. 1E shows a fourth example display screen of the client device shown in FIG. 1A.

FIG. 1E shows an example screen 172 including a prompt 174 warning the user 108 of the sensitivity of the file 134 in response to the user 108 selecting the "download" button 168 for the file 134. As illustrated, the prompt 174 may include text 176 indicating that the file 134 includes potentially sensitive information. The prompt 174 may include a "yes" button 180 and a "no" button 178. In response to the user 108 selecting the "no" button 178, no action with respect to the file 134 will be taken. In response to the user 108 selecting the "yes" button 180, the sensitivity management service 103 may provide a download token to the client device 106, which the client device 106 may use to download the file 134 to the first storage medium. In some implementations, in response to the user 108 selecting the "yes" button 180, the sensitivity management service 103 may delete the file 134 from the second storage medium. In some implementations, in response to the user 108 selecting the "yes" button 180, the sensitivity management service 103 may generate a timestamp and add an entry to a sensitive file observation list (described below in connection with FIG. 9) corresponding to the file 134.

With respect to steps 116 and 118 of the routine 114, in some implementations, if the web browser 124 does not support functionality which allows the sensitivity management engine 102 to halt (or postpone) the downloading of the file 134 in order for the sensitivity management engine 102 to determine whether the file 134 is potentially sensitive, the sensitivity management engine 102 may instead access the file 134 after it has been downloaded to the first storage medium to determine whether the file 134 is potentially sensitive. For example, the sensitivity management engine 102 may access a download folder associated with the web browser 124 to determine a download identifier associated with the file 134 to determine a source location from which the file 134 was downloaded. In response to determining that the file 134 is potentially sensitive and the user 108 selecting the "yes" button 144 (see FIG. 1C), in response to prompting the user 108, the sensitivity management engine 102 may initiate the process to download the file 134 to the second storage medium (as described above). In response to initiating the process to download the file 134 to the second storage medium, the sensitivity management engine 102 may cause the file 134 to be deleted from the first storage medium. For example, the sensitivity management engine 102 may communicate with a local agent (described in further detail below) and cause the local agent to delete the file 134 from the first storage medium.

With reference once more to FIG. 1C, if, for example, the user 108 were to select the "no" button 142 instead of the "yes" button 144, then the sensitivity management engine 102 would not initiate the process to download the file 134 to the second storage medium and would instead allow the file 134 to be downloaded to the first storage medium (e.g., the local storage of the client device 106). In some implementations, in response to the user 108 selecting the "no" button 142, the sensitivity management engine 102 may generate a timestamp and add an entry to the sensitive file observation list (as illustrated in FIG. 9) corresponding to the file 134.

Figure 9:
FIG. 9 shows an example sensitive file observation list in accordance with some aspects of the present disclosure.

As described in detail in Section G in connection with FIG. 9, the sensitivity management engine 102 may use a sensitive file observation list 900 to monitor potentially sensitive files that have been downloaded to the first storage medium. For example, the sensitivity management engine 102 may use the sensitive file observation list 900 to determine the file 134 has existed in the first storage medium for an amount of time (e.g., minutes, hours, days) and that the user 108 should be prompted to take an action with respect to the file 134. In response to such a determination, the sensitivity management engine 102 may cause the display 109 of the client device 106 to present a prompt to the user 108 requesting an action be taken with respect to the file 134 (as shown in FIG. 1F).

Figure 1F:
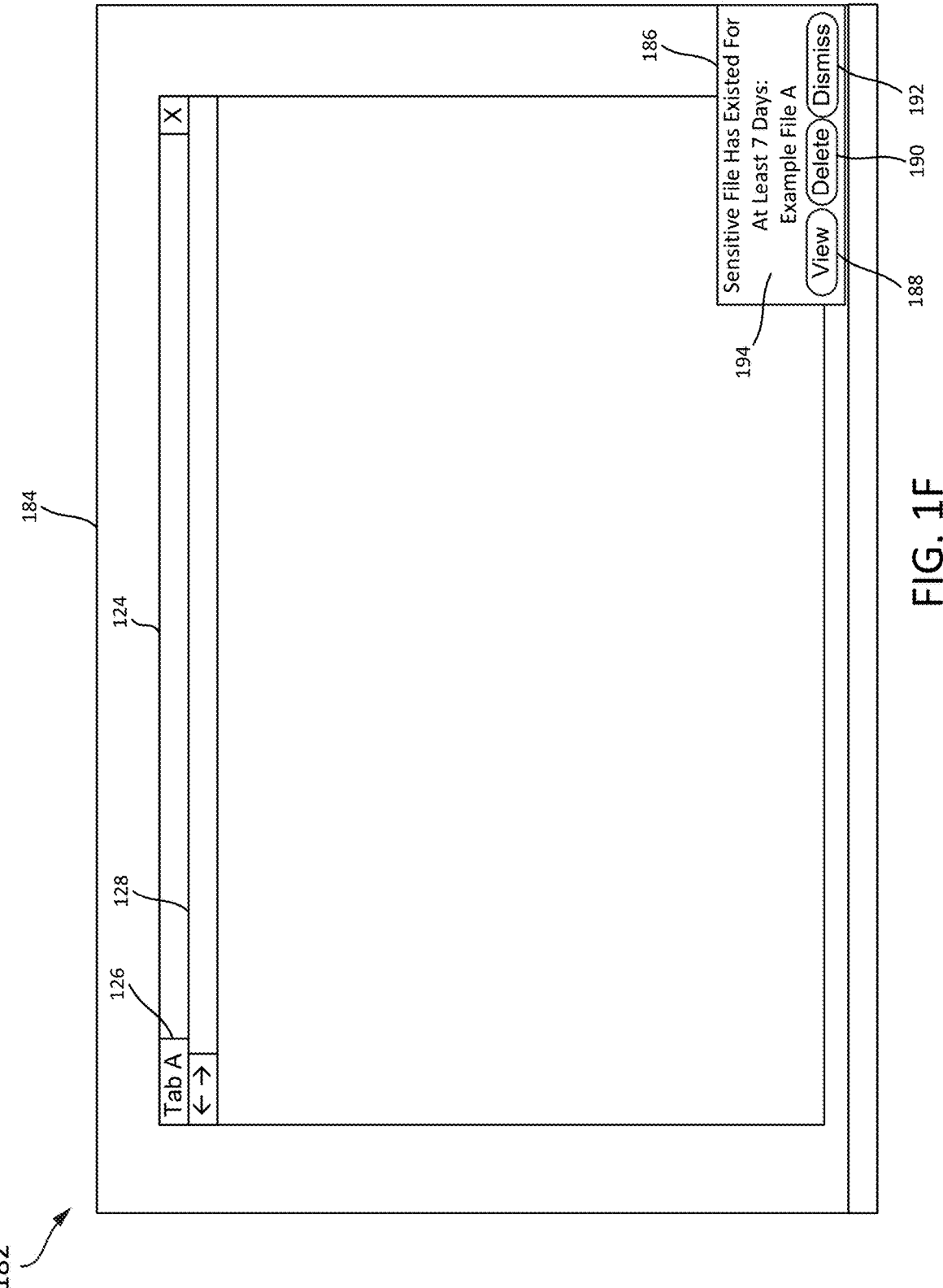
FIG. 1F shows a fifth example display screen of the client device shown in FIG. 1A.

FIG. 1F shows an example screen 182 of the sensitivity management engine 102 causing the display 109 of the client device 106 to present a prompt 186 to the user 108 to take an action with respect to the file 134. In some implementations, the sensitivity management engine 102 may cause the display 109 of the client device 106 to present the prompt 186 in response to determining that the user 108 has not taken an action (e.g., view, delete and/or modify) with respect to the file 134 for an amount of time. In some implementations, the prompt 186 may be presented on a desktop 184 of the client device 106, and may include text 194 indicating that the file 134 has existed on the first storage medium (e.g., the local storage of the client device 106) for a certain amount of time without being viewed, edited and/or deleted. For example, the amount of time indicated in the prompt 186 may be the "time to delete" entry 910 of the sensitive file observation list 900. In some implementations, the prompt 186 may further include the name of the file 134. For example, the name of the file 134 may be determined from the "file id" entry 904 of the sensitive file observation list 900. In some implementations, the prompt 186 may further include a "view" button 188, a "delete" button 190, and a "dismiss" button 192.

The "view" button 188 of the prompt 186 may cause the sensitivity management engine 102 to open the file 134 so that the user 108 may view the file 134. In some implementations, the sensitivity management engine 102 may open the file 134 using the web browser 124. For example, in response to determining that the user 108 has selected the "view" button 188, the sensitivity management engine 102 may access a download folder of the web browser to open the file 134. In some implementations, the sensitivity management engine 102 may open the file 134 using a local agent (described in more detail below). For example, in response to determining that the user 108 has selected the "view" button 188, the sensitivity management engine 102 may cause the local agent to open the file 134 from the first storage medium of the client device 106. In response to the sensitivity management engine 102 opening the file 134, the sensitivity management engine may generate a timestamp and set the "last accessed" entry 908 for the row of the sensitive file observation list 900 corresponding to the file 134 to the timestamp.

The "delete" button 190 of the prompt 186 may cause the file 134 to be deleted from the first storage medium (i.e., the local storage of the client device 106). In some implementations, the sensitivity management engine 102 may cause the file 134 to be deleted using the local agent (described in more detail below). For example, in response to determining that the user 108 has selected the "delete" button 190, the sensitivity management engine 102 may call the local agent to delete the file 134. In response to the sensitivity management engine 102 determining that the user 108 has selected the "delete" button 190, the sensitivity management engine 102 may delete the row of entries of the sensitive file observation list 900 corresponding to the file 134.

The "dismiss" button 192 of the prompt 186 may cause no action to be taken with respect to the file 134. In some implementations, in response to the sensitivity management engine 102 determining that the user 108 has selected the "dismiss" button 192, the sensitivity management engine 102 may generate a timestamp and set the "last accessed" entry 908 for the row of the sensitive file observation list 900 corresponding to the file 134 to the timestamp. In some implementations, the prompt 186 may further include an option to no longer receive prompts 186 with respect to the file 134.

In some implementations, the prompt 186 may further include an upload button (not illustrated), which may cause the file 134 to be uploaded to the second storage medium. In some implementations, in response to selection of such an upload button, the local agent may initiate the process to upload the file 134 to the second storage medium (as described above). In some implementations, the local agent may delete the file 134 from the first storage medium thereafter.

In some implementations, in response to the sensitivity management engine 102 determining that the user 108 has selected a button 188, 190, 192, of the prompt 186, the sensitivity management engine 102 may cause the display 109 of the client device 106 to no longer display the prompt 186.

B. Network Environment

Figure 2:
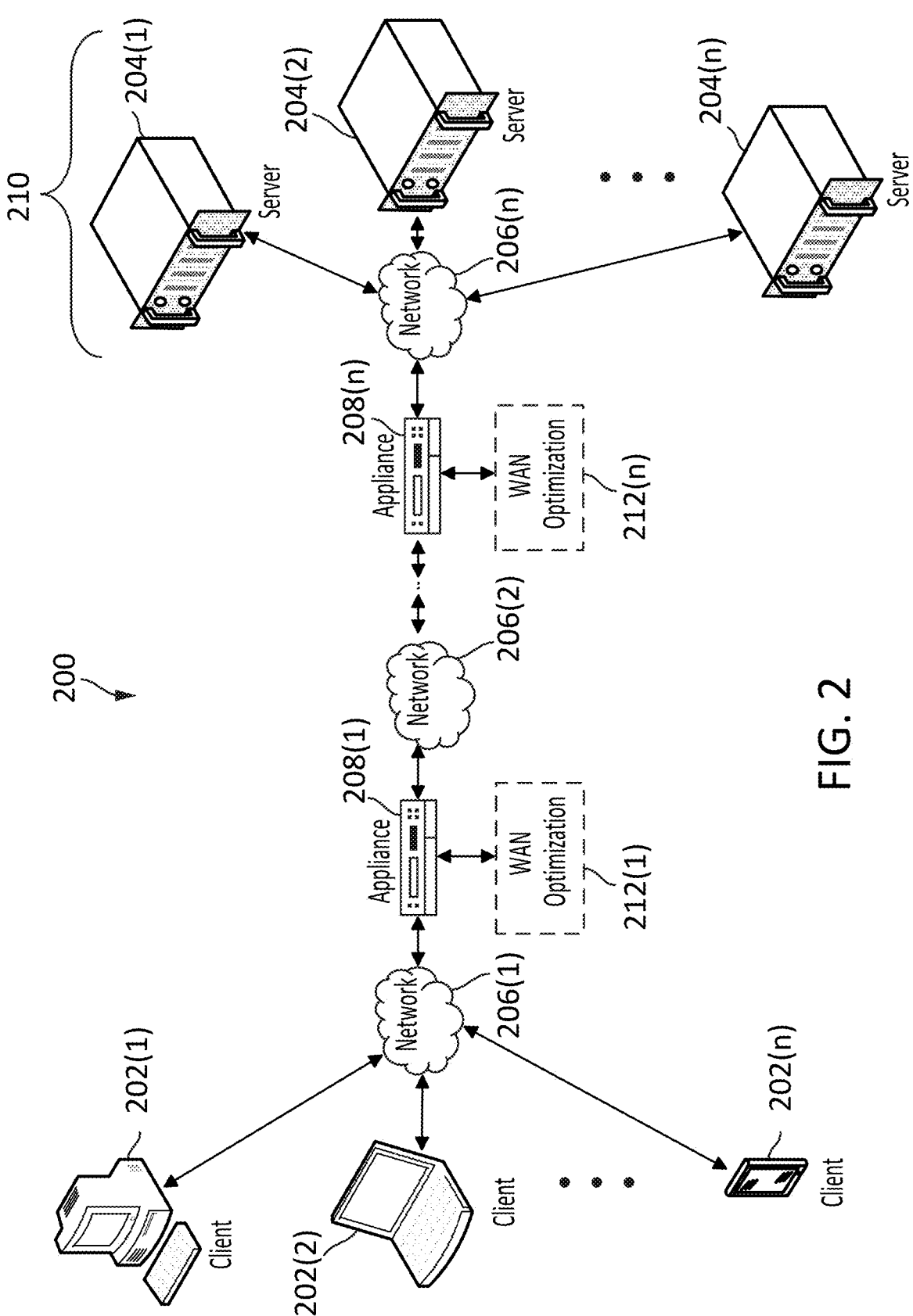
FIG. 2 is a diagram of a network environment in which some embodiments of the system disclosed herein may be deployed.

Referring to FIG. 2, an illustrative network environment 200 is depicted. As shown, the network environment 200 may include one or more clients 202(1)-202(*n*) (also generally referred to as local machine(s) 202 or client(s) 202) in communication with one or more servers 204(1)-204(*n*) (also generally referred to as remote machine(s) 204 or server(s) 204) via one or more networks 206(1)-206(*n*) (generally referred to as network(s) 206). In some embodiments, a client 202 may communicate with a server 204 via one or more appliances 208(1)-208(*n*) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(*n*) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(*n*), as well as the network 206(2), may be public networks. In yet other embodiments, all three of the network 206(1), the network 206(2) and the network 206(*n*) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(*n*) may be deployed between the network 206(2) and the network 206(*n*). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(*n*), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+ an organization.

C. Computing Environment

Figure 3:
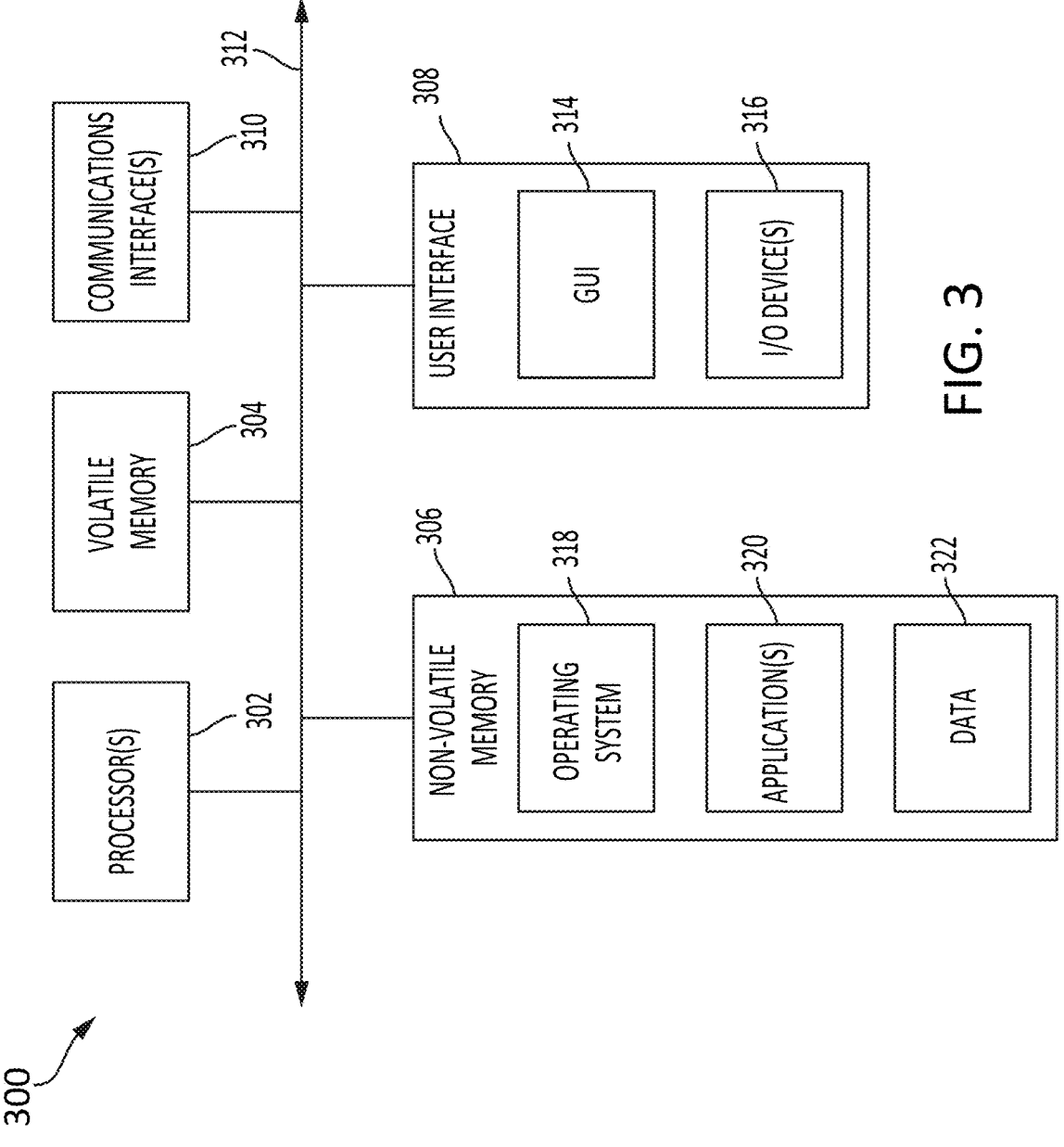
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212, etc.) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication with the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
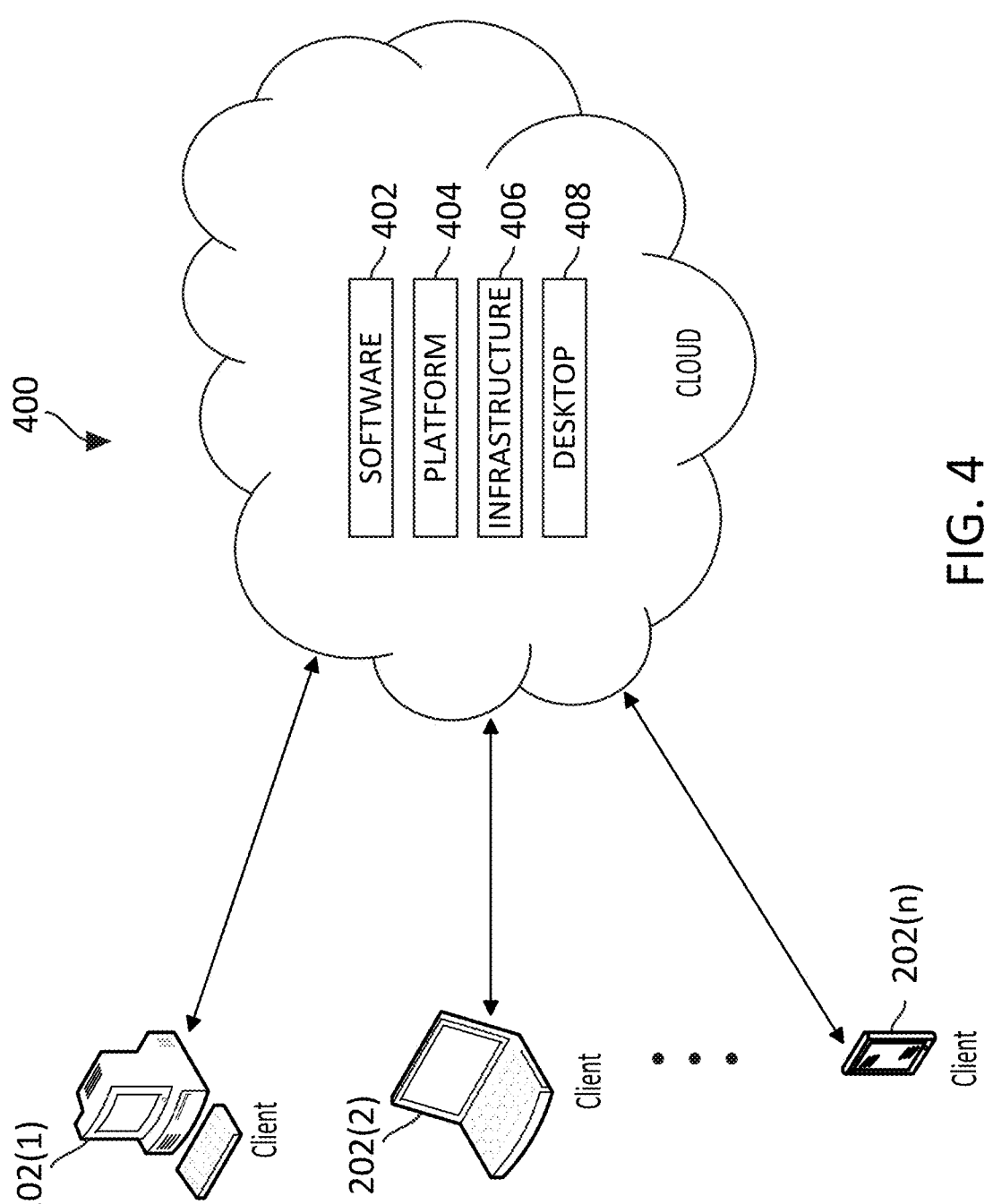
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS platforms include AMAZON WEB SERVICES provided by Amazon.com, Inc., of Seattle, Washington, Azure IaaS provided by Microsoft Corporation or Redmond, Washington, RACKSPACE CLOUD provided by Rackspace US, Inc., of San Antonio, Texas, Google Compute Engine provided by Google Inc., of Mountain View, California, and RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc., of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc., of San Francisco, California, or OFFICE 365 provided by Microsoft Corporation. Examples of SaaS may also include data storage providers, e.g. Citrix ShareFile® from Citrix Systems, DROPBOX provided by Dropbox, Inc., of San Francisco, California, Microsoft SKYDRIVE provided by Microsoft Corporation, Google Drive provided by Google Inc., or Apple ICLOUD provided by Apple Inc., of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

Figure 5A:
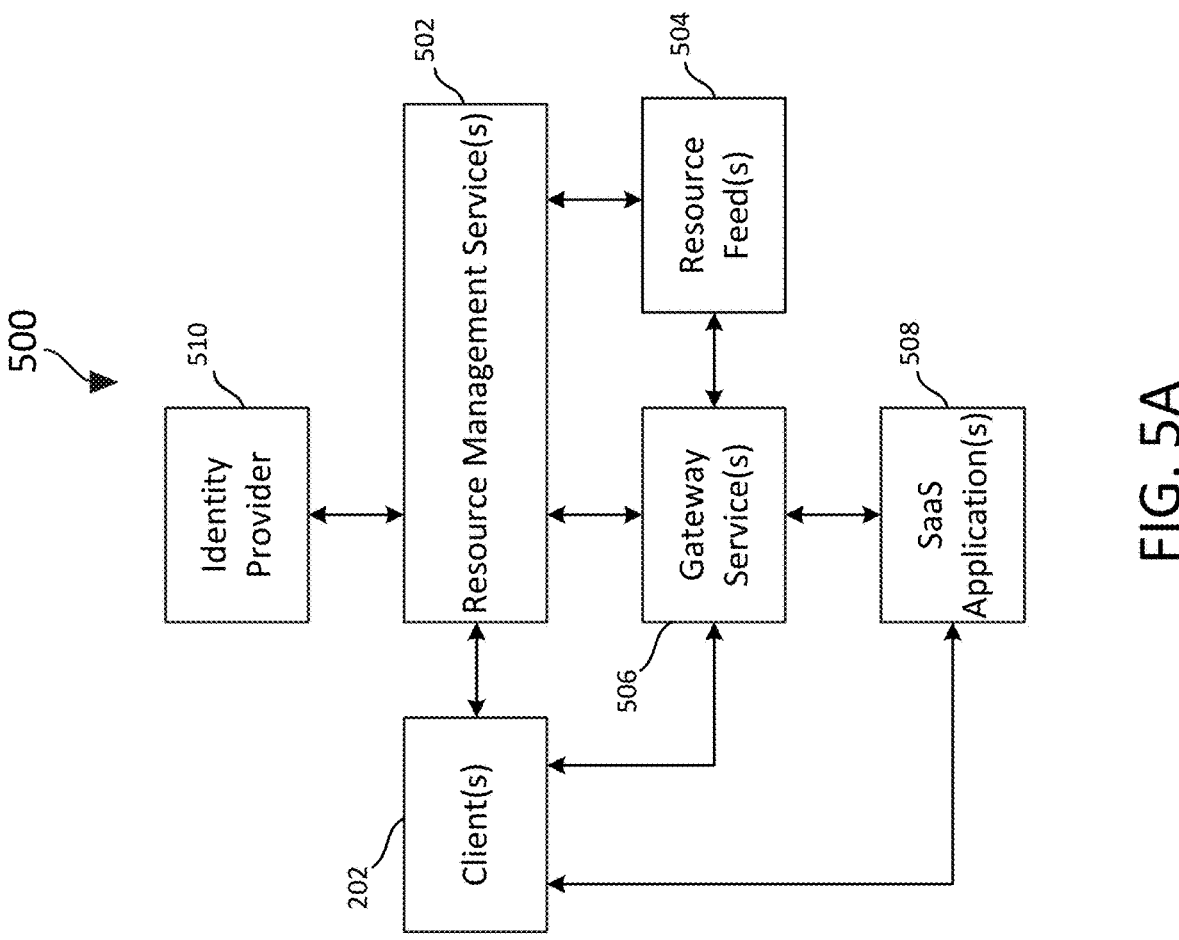
FIG. 5A is a block diagram of an example system in which resource management services may manage and streamline access by clients to resource feeds (via one or more gateway service) and/or software-as-a-service (SaaS) applications.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one of more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

Figure 5B:
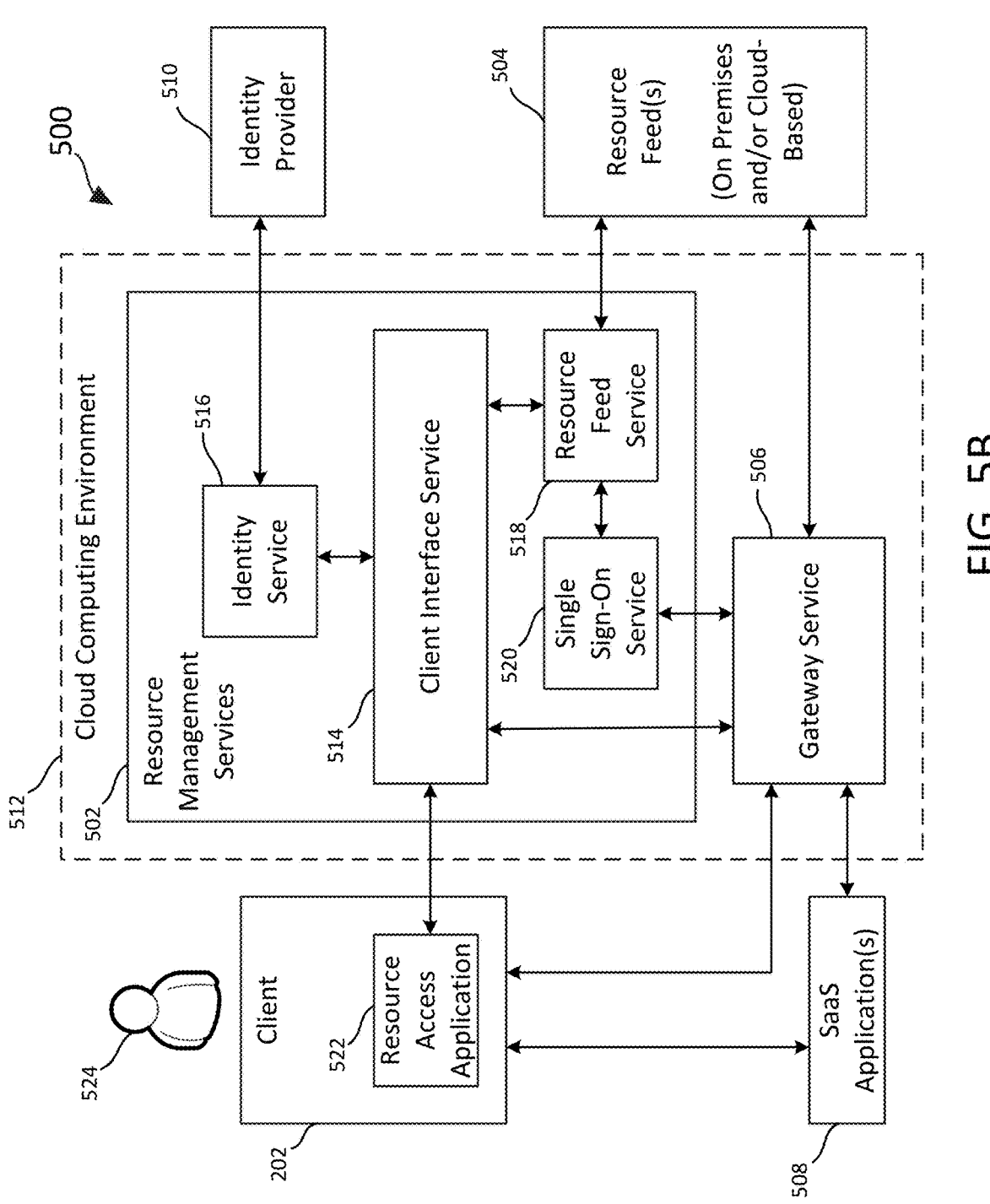
FIG. 5B is a block diagram showing an example implementation of the system shown in FIG. 5A in which various resource management services as well as a gateway service are located within a cloud computing environment.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B)

may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., username and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed). The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522.

The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

Figure 5C:
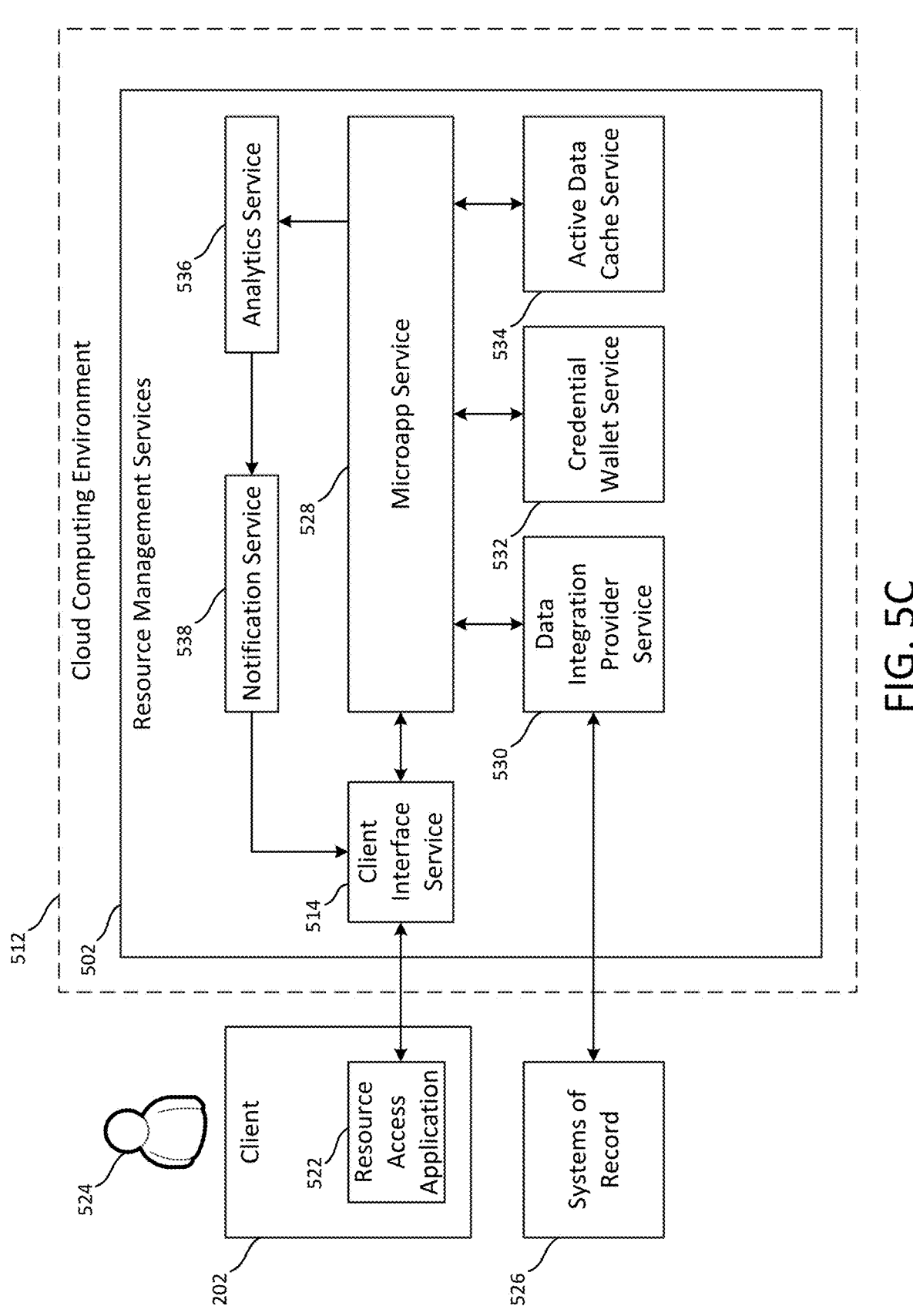
FIG. 5C is a block diagram similar to that shown in FIG. 5B, but in which the available resources are represented by a single box labeled "systems of record," and further in which several different service are included among the resource management services.

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or home-grown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically cause active data to be pulled from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
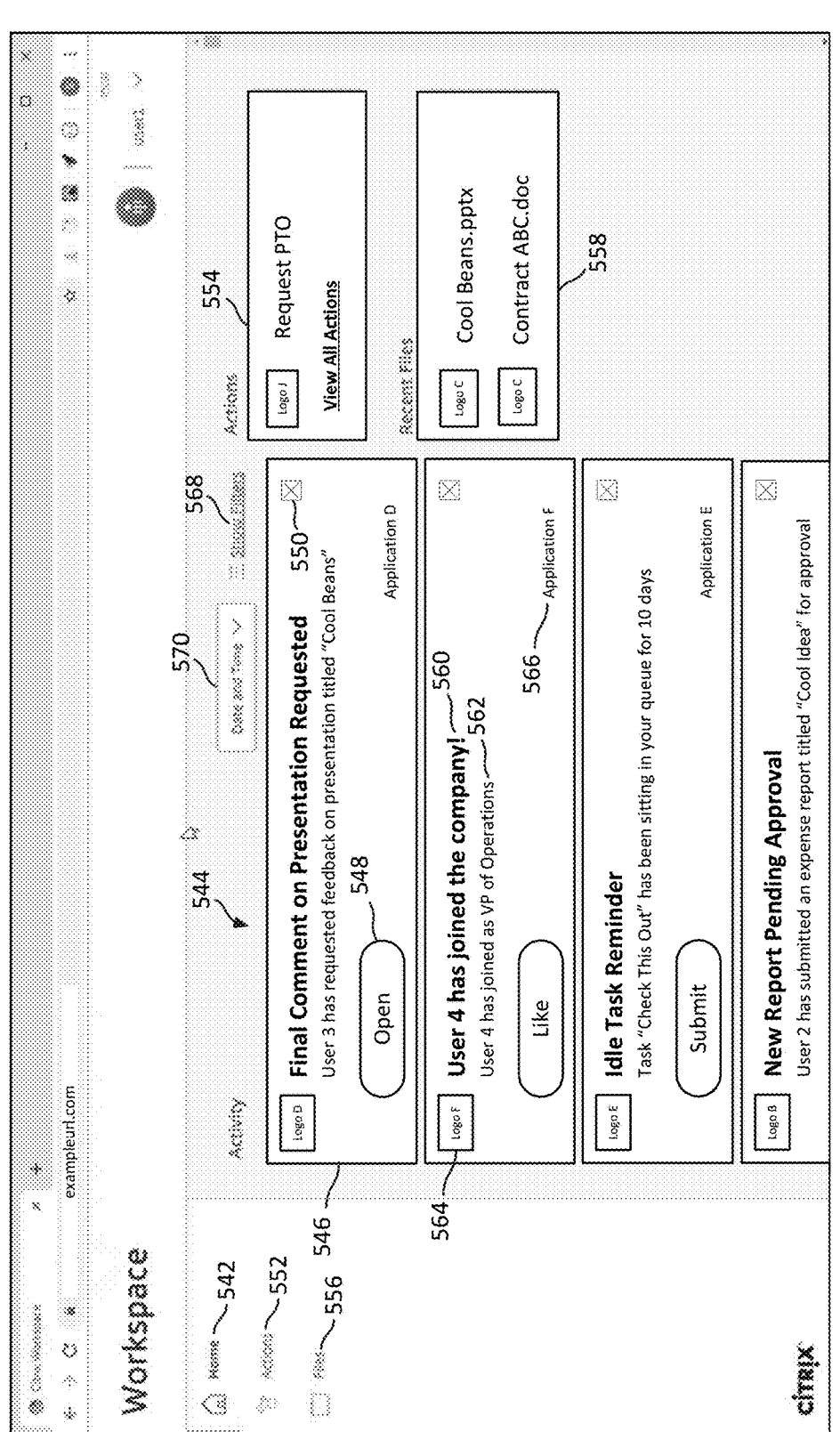
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one of more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D) and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform)

by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

F. Systems and Methods for Providing File Sharing Over Network(s)

Figure 6A:
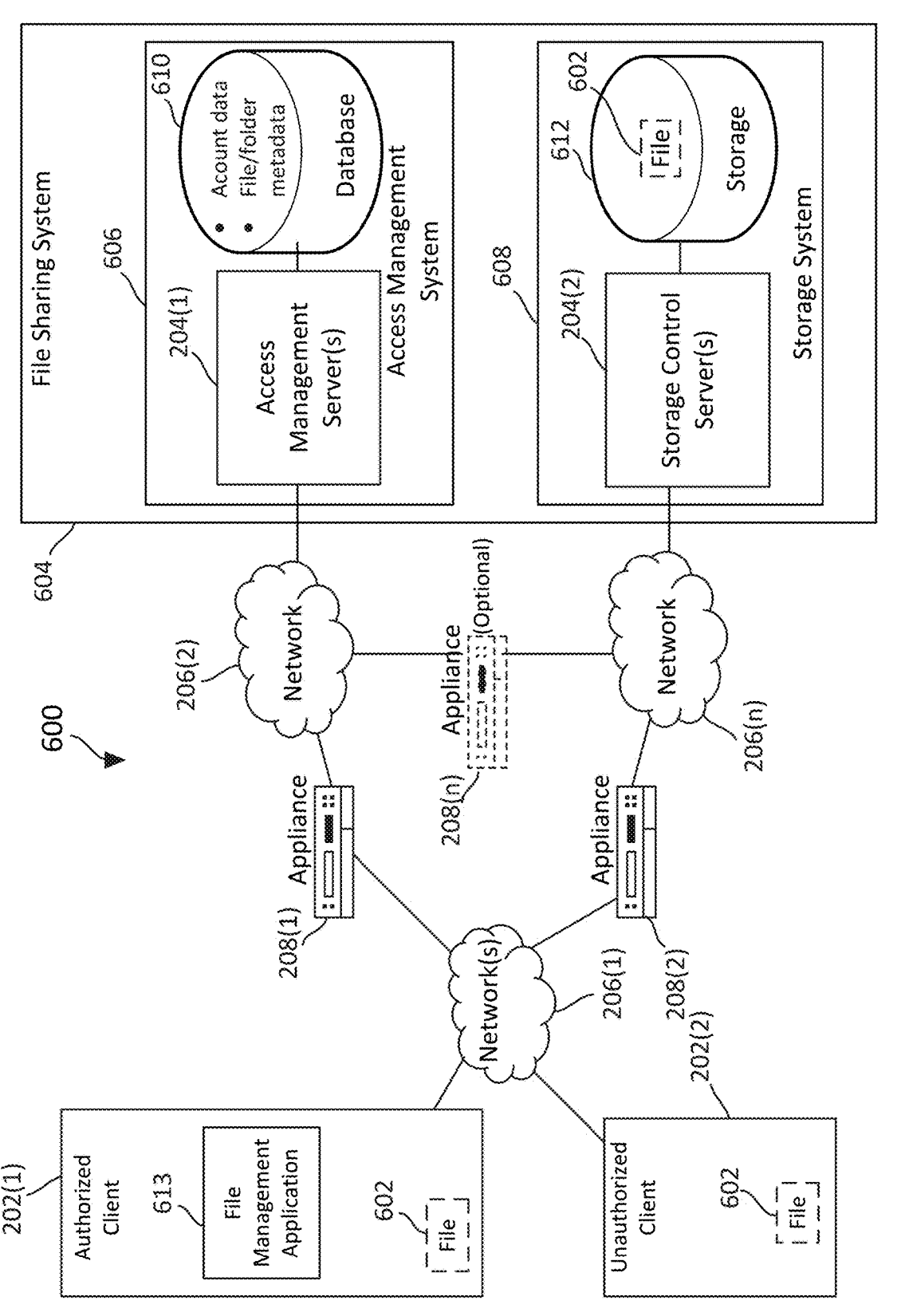
FIG. 6A is a diagram illustrating how a network computing environment like that shown in FIG. 2 may be configured to allow clients access to an example embodiment of a server-based file sharing system.

FIG. 6A shows an example network environment 600 for allowing an authorized client 202(1) and/or an unauthorized client 202(2) to upload a file 602 to a file sharing system 604 or download a file 602 from the file sharing system 604. The authorized client 202(1) may, for example, be a client 202 operated by a user having an active account with the file sharing system 604, while the unauthorized client 202(2) may be operated by a user who lacks such an account. As shown, in some embodiments, the authorized client 202(1) may include a file management application 613 with which a user of the authorized client 202(1) may access and/or manage the accessibility of one or more files 602 via the file sharing system 604. The file management application 613 may, for example, be a mobile or desktop application installed on the authorized client 202(1) (or in a computing environment accessible by the authorized client). The Share-File® mobile app and the ShareFile® desktop app offered by Citrix Systems, Inc., of Fort Lauderdale, FL, are examples of such preinstalled applications. In other embodiments, rather than being installed on the authorized client 202(1), the file management application 613 may be executed by a web server (included with the file sharing system 604 or elsewhere) and provided to the authorized client 202(1) via one or more web pages.

As FIG. 6A illustrates, in some embodiments, the file sharing system 604 may include an access management system 606 and a storage system 608. As shown, the access management system 606 may include one or more access management servers 204(1) and a database 610, and the storage system 608 may include one or more storage control servers 204(2) and a storage medium 612. In some embodiments, the access management server(s) 204(1) may, for example, allow a user of the file management application 613 to log in to his or her account, e.g., by entering a user name and password corresponding to account data stored in the database 610. Once the user of the client 202(1) has logged in, the access management server 204(1) may enable the user to view (via the authorized client 202(1)) information identifying various folders represented in the storage medium 612, which is managed by the storage control server(s) 204(2), as well as any files 602 contained within such folders. File/folder metadata stored in the database 610 may be used to identify the files 602 and folders in the storage medium 612 to which a particular user has been provided access rights.

In some embodiments, the clients 202(1), 202(2) may be connected to one or more networks 206(1) (which may include the Internet), the access management server(s) 204 (1) may include webservers, and an appliance 208(1) may load balance requests from the authorized client 202(1) to such webservers. The database 610 associated with the access management server(s) 204(1) may, for example, include information used to process user requests, such as user account data (e.g., username, password, access rights, security questions and answers, etc.), file and folder meta-data (e.g., name, description, storage location, access rights, source IP address, etc.), and logs, among other things. Although the clients 202(1), 202(2) are shown in FIG. 6A as stand-alone computers, it should be appreciated that one or both of the clients 202(1), 202(2) shown in FIG. 6A may instead represent other types of computing devices or systems that can be operated by users. In some embodiments, for example, one or both of the authorized client 202(1) and the unauthorized client 202(2) may be implemented as a server-based virtual computing environment that can be remotely accessed using a separate computing device operated by users, such as described above.

In some embodiments, the access management system 606 may be logically separated from the storage system 608, such that files 602 and other data that are transferred between clients 202 and the storage system 608 do not pass through the access management system 606. Similar to the access management server(s) 204(1), one or more appliances 208(2) may load-balance requests from the clients 202(1), 202(2) received from the network(s) 206(1) (which may include the Internet) to the storage control server(s) 204(2). In some embodiments, the storage control server(s) 204(2) and/or the storage medium 612 may be hosted by a cloud-based service provider (e.g., Amazon Web Services™ or Microsoft Azure™). In other embodiments, the storage control server(s) 204(2) and/or the storage medium 612 may be located at a data center managed by an enterprise of a client 202, or may be distributed among some combination of a cloud-based system and an enterprise system, or elsewhere.

After a user of the authorized client 202(1) has properly logged in to an access management server 204(1), the server 204(1) may receive a request from the client 202(1) for access to one of the files 602 or folders to which the logged in user has access rights. The request may either be for the authorized client 202(1) to itself to obtain access to a file 602 or folder or to provide such access to the unauthorized client 202(2). In some embodiments, in response to receiving an access request from an authorized client 202(1), the access management server 204(1) may communicate with the storage control server(s) 204(2) (e.g., either over the Internet via appliances 208(1) and 208(2) or via an appliance 208(n) positioned between networks 206(2) and 206(n)) to obtain a token generated by the storage control server 204(2) that can subsequently be used to access the identified file 602 or folder.

In some implementations, the generated token may, for example, be sent to the authorized client 202(1), and the authorized client 202(1) may then send a request for a file 602, including the token, to the storage control server(s) 202(2). In other implementations, the authorized client 202 (1) may send the generated token to the unauthorized client 202(2) so as to allow the unauthorized client 202(2) to send a request for the file 602, including the token, to the storage control server(s) 204(2). In yet other implementations, an access management server 204(1) may, at the direction of the authorized client 202(1), send the generated token directly to the unauthorized client 202(2) so as to allow the unauthorized client 202(2) to send a request for the file 602, including the token, to the storage control server(s) 204(2). In any of the forgoing scenarios, the request sent to the storage control server(s) 204(2) may, in some embodiments, include a uniform resource locator (URL) that resolves to an internet protocol (IP) address of the storage control server(s) 204(2), and the token may be appended to or otherwise accompany the URL. Accordingly, providing access to one or more clients 202 may be accomplished, for example, by causing the authorized client 202(1) to send a request to the URL address, or by sending an email, text message or other communication including the token-containing URL to the unauthorized client 202(2), either directly from the access management server(s) 204(1) or indirectly from the access management server(s) 204(1) to the authorized client 202(1) and then from the authorized client 202(1) to the unauthorized client 202(2). In some embodiments, selecting the URL or a user interface element corresponding to the URL, may cause a request to be sent to the storage control server(s) 204(2) that either causes a file 602 to be downloaded immediately to the client that sent the request, or may cause the storage control server 204(2) to return a webpage to the client that includes a link or other user interface element that can be selected to effect the download.

In some embodiments, a generated token can be used in a similar manner to allow either an authorized client 202(1) or an unauthorized client 202(2) to upload a file 602 to a folder corresponding to the token. In some embodiments, for example, an "upload" token can be generated as discussed above when an authorized client 202(1) is logged in and a designated folder is selected for uploading. Such a selection may, for example, cause a request to be sent to the access management server(s) 204(1), and a webpage may be returned, along with the generated token, that permits the user to drag and drop one or more files 602 into a designated region and then select a user interface element to effect the upload. The resulting communication to the storage control server(s) 204(2) may include both the to-be-uploaded file(s) 602 and the pertinent token. On receipt of the communication, a storage control server 204(2) may cause the file(s) 602 to be stored in a folder corresponding to the token.

In some embodiments, sending a request including such a token to the storage control server(s) 204(2) (e.g., by selecting a URL or user interface element included in an email inviting the user to upload one or more files 602 to the file sharing system 604), a webpage may be returned that permits the user to drag and drop one or more files 602 into a designated region and then select a user interface element to effect the upload. The resulting communication to the storage control server(s) 204(2) may include both the to-be-uploaded file(s) 602 and the pertinent token. On receipt of the communication, a storage control server 204(2) may cause the file(s) 602 to be stored in a folder corresponding to the token.

In the described embodiments, the clients 202, servers 204, and appliances 208 and/or 212 (appliances 212 are shown in FIG. 2) may be deployed as and/or executed on any type and form of computing device, such as any desktop computer, laptop computer, rack-mounted computer, or mobile device capable of communication over at least one network and performing the operations described herein. For example, the clients 202, servers 204 and/or appliances 208 and/or 212 may correspond to respective computing systems, groups of computing systems, or networks of distributed computing systems, such as the network environment 200 shown in FIG. 2.

Figure 6B:
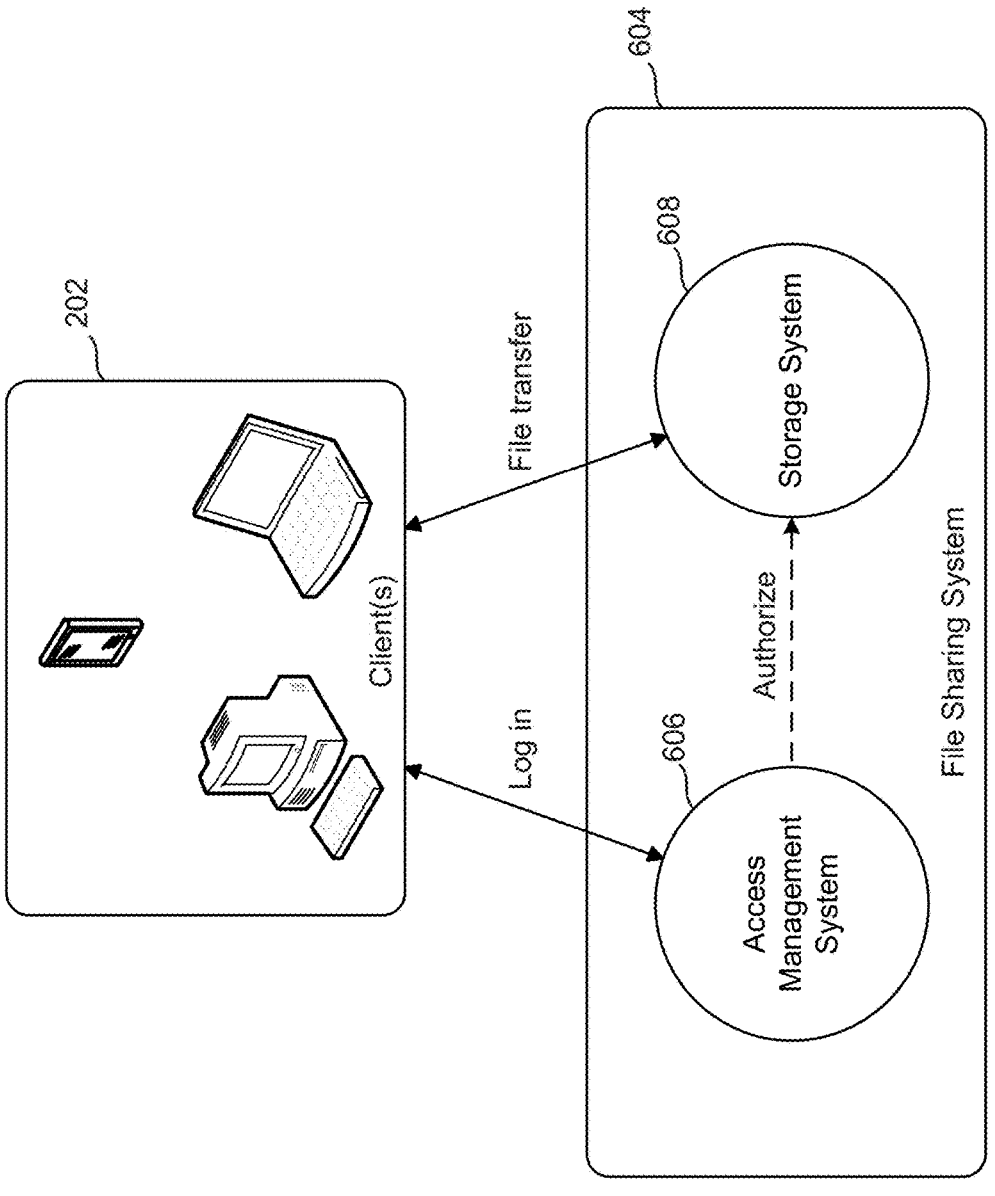
FIG. 6B is a diagram illustrating certain operations that may be performed by the file sharing system shown in FIG. 6A in accordance with some embodiments.

As discussed above in connection with FIG. 6A, in some embodiments, a file sharing system may be distributed between two sub-systems, with one subsystem (e.g., the access management system 606) being responsible for controlling access to files 602 stored in the other subsystem (e.g., the storage system 608). FIG. 6B illustrates conceptually how one or more clients 202 may interact with two such subsystems.

As shown in FIG. 6B, an authorized user operating a client 202, which may take on any of numerous forms, may log in to the access management system 606, for example, by entering a valid user name and password. In some embodiments, the access management system 606 may include one or more webservers that respond to requests from the client 202. The access management system 606 may store metadata concerning the identity and arrangements of files 602 (shown in FIG. 6A) stored by the storage system 608, such as folders maintained by the storage system 608 and any files 602 contained within such folders. In some embodiments, the metadata may also include permission metadata identifying the folders and files 602 that respective users are allowed to access. Once logged in, a user may employ a user interface mechanism of the client 202 to navigate among folders for which the metadata indicates the user has access permission.

In some embodiments, the logged-in user may select a particular file 602 the user wants to access and/or to which the logged-in user wants a different user of a different client 202 to be able to access. Upon receiving such a selection from a client 202, the access management system 606 may take steps to authorize access to the selected file 602 by the logged-in client 202 and/or the different client 202. In some embodiments, for example, the access management system 606 may interact with the storage system 608 to obtain a unique "access token" which may subsequently be used by a client 202 to retrieve the identified file 602 from the storage system 608. The access management system 606 may, for example, send the access token to the logged-in client 202 and/or a client 202 operated by a different user. In some embodiments, the access token may a single-use token that expires after its first use.

In some embodiments, the storage system 608 may also include one or more webservers and may respond to requests from clients 202. In such embodiments, one or more files 602 may be transferred from the storage system 608 to a client 202 in response to a request that includes the access token. In some embodiments, for example, the access token may be appended to a URL that resolves to an IP address of the webserver(s) of the storage system 608. Access to a given file 602 may thus, for example, be enabled by a "view link" that includes the URL/token. Such a view link may, for example, be sent the logged-in client 202 in the form of a "view" button 166 or other user interface element the user can select to effect the transfer of the file 602 from the storage system 608 to the client 202. Alternatively, the view link may be sent to a different client 202 operated by an individual with which the logged-in user desires to share the file 602. For example, in some embodiments, the access management system 606 may send an email or other message to the different client 202 that includes the view link in the form of a "view" button 166 or other user interface element, or simply with a message indicating "Click Here to View" or the like. In yet other embodiments, the logged-in client 202 may receive the view link from the access management system 606 and cut-and-paste or otherwise copy the view link into an email or other message the logged in user can then send to the other client 202 to enable the other client 202 to retrieve the file 602 from the storage system 608.

In some embodiments, a logged-in user may select a folder on the file sharing system to which the user wants to transfer one or more files 602 (shown in FIG. 6A) from the logged-in client 202, or to which the logged-in user wants to allow a different user of a different client 202 to transfer one or more files 602. Additionally or alternatively, the logged-in user may identify one or more different users (e.g., by entering their email addresses) the logged-in user wants to be able to access one or more files 602 currently accessible to the logged-in client 202.

Similar to the file viewing process described above, upon receiving such a selection from a client 202, the access management system 606 may take steps to authorize access to the selected folder by the logged-in client 202 and/or the different client 202. In some embodiments, for example, the access management system 606 may interact with the storage system 608 to obtain a unique "upload token" which may subsequently be used by a client 202 to transfer one or more files 602 from the client 202 to the storage system 608. The access management system 606 may, for example, send the upload token to the logged-in client 202 and/or a client 202 operated by a different user.

One or more files 602 may be transferred from a client 202 to the storage system 608 in response to a request that includes the upload token. In some embodiments, for example, the upload token may be appended to a URL that resolves to an IP address of the webserver(s) of the storage system 608. For example, in some embodiments, in response to a logged-in user selecting a folder to which the user desires to transfer one or more files 602 and/or identifying one or more intended recipients of such files 602, the access management system 606 may return a webpage requesting that the user drag-and-drop or otherwise identify the file(s) 602 the user desires to transfer to the selected folder and/or a designated recipient. The returned webpage may also include an "upload link," e.g., in the form of an "UPLOAD" button or other user interface element that the user can select to effect the transfer of the file(s) 602 from the client 202 to the storage system 608.

In some embodiments, in response to a logged-in user selecting a folder to which the user wants to enable a different client 202 operated by a different user to transfer one or more files 602, the access management system 606 may generate an upload link that may be sent to the different client 202. For example, in some embodiments, the access management system 606 may send an email or other message to the different client 202 that includes a message indicating that the different user has been authorized to transfer one or more files 602 to the file sharing system, and inviting the user to select the upload link to effect such a transfer. Section of the upload link by the different user may, for example, generate a request to webserver(s) in the storage system and cause a webserver to return a webpage inviting the different user to drag-and-drop or otherwise identify the file(s) 602 the different user wishes to upload to the file sharing system 604. The returned webpage may also include a user interface element, e.g., in the form of an "UPLOAD" button, that the different user can select to effect the transfer of the file(s) 602 from the client 202 to the storage system 608. In other embodiments, the logged-in user may receive the upload link from the access management system 606 and may cut-and-paste or otherwise copy the upload link into an email or other message the logged-in user can then send to the different client 202 to enable the different client to upload one or more files 602 to the storage system 608.

In some embodiments, in response to one or more files 602 being uploaded to a folder, the storage system 608 may send a message to the access management system 606 indicating that the file(s) 602 have been successfully uploaded, and an access management system 606 may, in turn, send an email or other message to one or more users indicating the same. For user's that have accounts with the file sharing system 604, for example, a message may be sent to the account holder that includes a view link that the account holder can select to view the file 602. Alternatively, the message to the account holder may include a link to a webpage from the access management system 606 inviting the account holder to log in to retrieve the transferred files 602. Likewise, in circumstances in which a logged-in user identifies one or more intended recipients for one or more to-be-uploaded files 602 (e.g., by entering their email addresses), the access management system 606 may send a message including a view link to the designated recipients (e.g., in the manner described above), which such designated recipients can then use to view the file(s) 602.

Figure 6C:
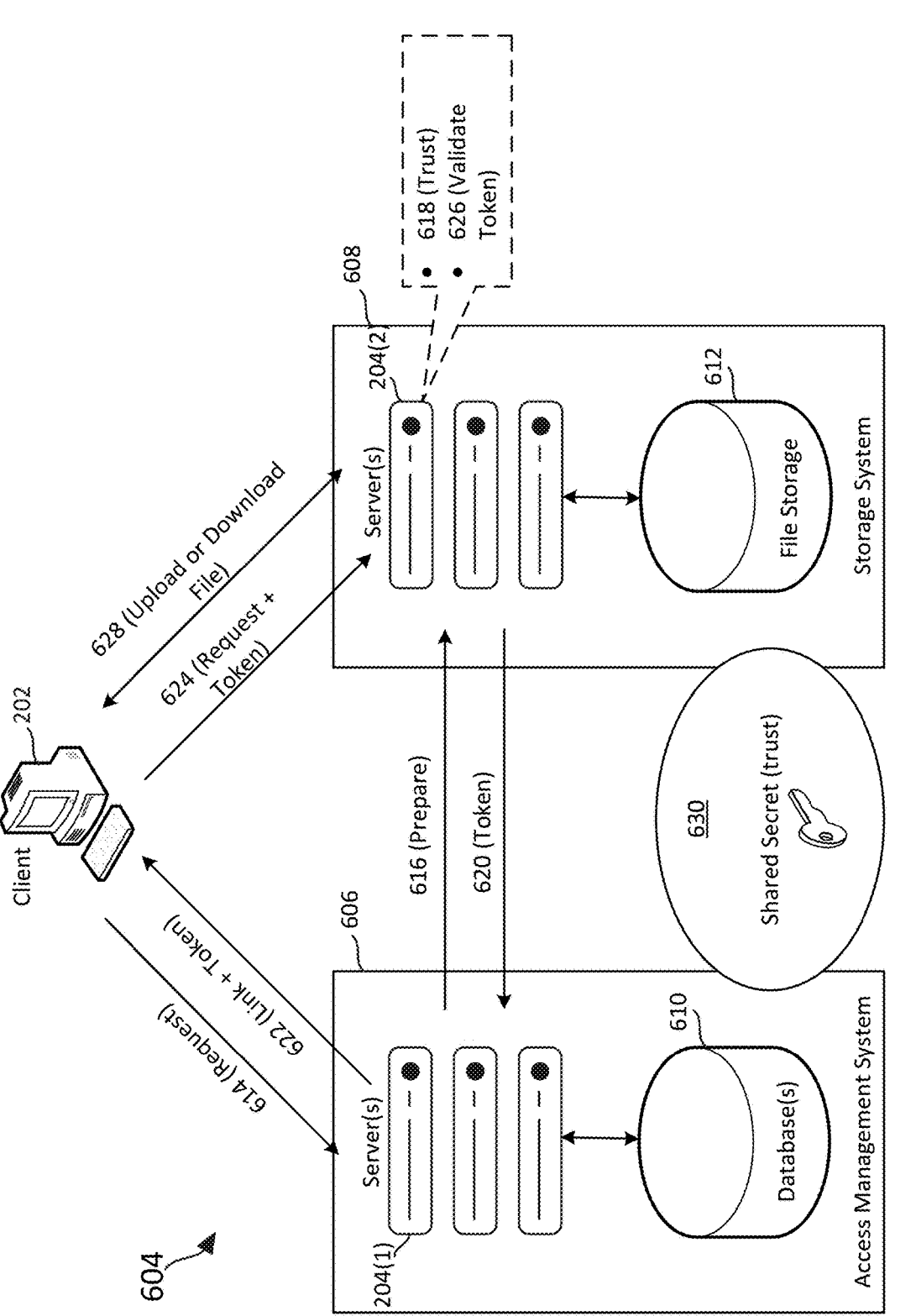
FIG. 6C is a diagram illustrating additional operations that may be performed by the file sharing system shown in FIG. 6A in accordance with some embodiments.

FIG. 6C is a block diagram showing an example of a process for generating access tokens (e.g., the upload tokens and access tokens discussed above) within the file sharing system 604 described in connection with FIGS. 6A and 6B.

As shown, in some embodiments, a logged-in client 202 may initiate the access token generation process by sending an access request 614 to the access management server(s) 204(1). As noted above, the access request 614 may, for example, correspond to one or more of (A) a request to enable the viewing of one or more files 602 (shown in FIG. 6A) in the storage system 608, (B) a request to enable the viewing of one or more files 602 in the storage system 608 from a different client 202 operated by a different user, (C) a request to enable the uploading of one or more files 602 from a logged-in client 202 to a folder on the storage system 608, (D) a request to enable the uploading of one or more files 602 from a different client 202 operated by a different user to a folder of the storage system 608, (E) a request to enable the transfer of one or more files 602, via the storage system 608, from a logged in client 202 to a different client 202 operated by a different user, or (F) a request to enable the transfer of one or more files 602, via the storage system 608, from a different client 202 operated by a different user to a logged-in client 202.

In response to receiving the access request 614, an access management server 204(1) may send a "prepare" message 616 to the storage control server(s) 204(2) of the storage system 608, identifying the type of action indicated in the request, as well as the identity and/or location within the storage medium(s) 612 of any applicable folders and/or files 602. As shown, in some embodiments, a trust relationship may be established (step 618) between the storage control server(s) 204(2) and the access management server(s) 204(1). In some embodiments, for example, the storage control server(s) 204(2) may establish the trust relationship by validating a hash-based message authentication code (HMAC) based on shared secret or key (see step 630).

After the trust relationship has been established, the storage control server(s) 204(2) may generate and send (step 620) to the access management server(s) 204(1) a unique upload token and/or a unique access token, such as those as discussed above.

After the access management server(s) 204(1) receive a token from the storage control server(s) 204(2), the access management server(s) 204(1) may prepare and send a link 622 including the token to one or more client(s) 202. In some embodiments, for example, the link may contain a fully qualified domain name (FQDN) of the storage control server(s) 204(2), together with the token. As discussed above, the link 622 may be sent to the logged-in client 202 and/or to a different client 202 operated by a different user, depending on the operation that was indicated by the request.

The client(s) 202 that receive the token may thereafter send a request 624 (which includes the token) to the storage control server(s) 204(2). In response to receiving the request, the storage control server(s) 204(2) may validate (step 626) the token and, if the validation is successful, the storage control server(s) 204(2) may interact with the client(s) 202 to effect the transfer (step 628) of the pertinent file(s) 602, as discussed above.

G. Detailed Description of Example Embodiments of the System for Secure Storage and Maintenance of Potentially Sensitive File Downloads Section A introduced various systems and techniques for enabling secure storage and maintenance of potentially sensitive file downloads by detecting that a user is attempting to download a file to a first storage medium, determining that the file is potentially sensitive, informing the user as to the sensitivity of the file, and offering to download the file to a second storage medium instead of the first storage medium. Further, if the user chooses to download the file to the first storage medium instead of the second storage medium, then the file may be monitored while it exists on the first storage medium and the user may be informed if the file exists on the first storage medium for an amount of time without being deleted or modified. For instance, as Section A explain in connection with FIGS. 1A-1F, in some implementations, the sensitivity management engine 102 may be used to detect that the user 108 is attempting to download a file 134 (see FIG. 1B), determine that the file 134 is potentially sensitive, inform the user of the sensitivity of the file, and offer to download the file 134 to a second storage medium instead of the first storage medium (see FIG. 1C), send a link to the sensitivity management service 103 to download the file 134, and receive a link to the file 134 in the second storage medium (see FIG. 1D), where the user 108 may be informed of the sensitivity of the file 134 if the user 108 attempts to download the file 134 to the first storage medium from the second storage medium (see FIG. 1E). Alternatively or additionally, if the user 108 decides to download the file 134 to the first storage medium, the sensitivity management engine 102 may be used to monitor the file 134 while it exists on the first storage medium and prompt the user 108 to take an action with respect to the file 134 in response to determining that the file 134 has existed on the first storage medium for an amount of time without being viewed, deleted or modified (see FIG. 1F).

Figure 7:
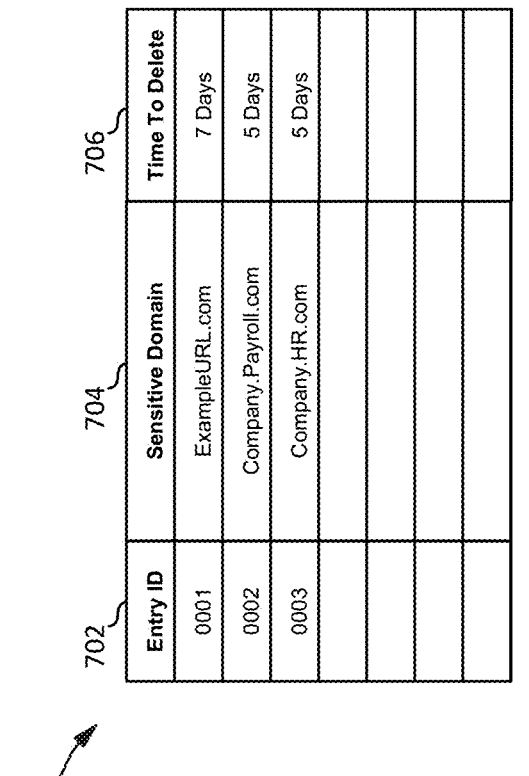
FIG. 7 shows an example sensitive domain list in accordance with some aspects of the present disclosure.

FIGS. 7 and 8 show, respectively, examples of a sensitive domain list 700 and a sensitive keyword list 800 that may be used by the sensitivity management engine 102 to determine if a file is potentially sensitive. As seen in FIG. 7, the sensitive domain list 700 may include "entry id" entries 702, "sensitive domain" entries 704, and "time to delete" entries 706.

In some implementations, the "entry id" entries 702 may be unique identifiers assigned by the sensitive domain list 700 for respective rows of entries in the sensitive domain list 700.

In some implementations, the "sensitive domain" entries 704 are domains associated with web pages determined to include potentially sensitive downloadable files.

In some implementations, the "time to delete" entries 706 may indicate amounts of time (e.g., hours, days, etc.) that files downloaded from websites corresponding to the associated "sensitive domain" entries 704 can exist on a first storage medium (e.g., a local storage of the client device 106) without being modified or deleted before the sensitivity management engine 102 may prompt the user 108 to take an action with respect to those files.

As seen in FIG. 8, the sensitive keyword list 800 may include "entry id" entries 802, "sensitive keyword" entries 804, and "time to delete" entries 806.

In some implementations, the "entry id" entries 802 may be unique identifiers assigned by the sensitive keyword list 800 for respective rows of entries in the sensitive keyword list 800.

In some implementations, the "sensitive keyword" entries 804 may be keywords determined to be associated with potentially sensitive information. In some implementations, the "sensitive keyword" entries 804 may further include patterns of alphabetical, numerical, and/or alphanumerical characters that are determined to be associated with potentially sensitive information.

In some implementations, the "time to delete" entries 806 may indicate amounts of time (e.g., hours, days, etc.) that files which include the sensitive keywords corresponding to the "sensitive keyword" entries 804 can exist on a first storage medium (e.g., a local storage of the client device 106) without being modified or deleted before the sensitivity management engine 102 may prompt the user 108 to take an action with respect to those files.

The sensitivity management engine 102 may, in some implementations, access the contents of the file 134 by previewing the file 134 after detecting the user 108 has attempted to download the file 134. For example, rather than downloading the file to the first storage medium and then viewing the file, the sensitivity management engine 102 may download the file 134 to a temporary storage folder associated with the web browser and view the file's 134 contents to determine whether the file 134 is potentially sensitive. Downloading the file 134 to the temporary storage folder ensures that the file 134 does not have to be downloaded to a permanent location on the first storage medium in order for the sensitivity management engine 102 to access the file. For example, clearing a cache associated with the web browser may automatically remove the file 134 from the temporary storage folder. In some implementations, the sensitivity management engine 102 may be configured to monitor the existence of the file 134 in the temporary storage folder and prompt the user 108 to take an action with respect to the file 134.

In some implementations, the sensitivity management engine 102 may determine that metadata associated with the file 134, or the domain associated with the website that the file 134 is to be downloaded from, matches an entry of the sensitive keyword list 800 or the sensitive domain list 700, respectively, based on a cosine similarity. For example, the cosine similarity equation may be:

$$\cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}}$$

With respect to the above equation, "A" may correspond to the metadata associated with the file (e.g., the file name) or the domain associated with the website that the file 134 is to be downloaded from and "B" may correspond to an entry from the sensitive keyword list 800 or sensitive domain list 700, respectively. If the output of the cosine similarity meets a threshold score (e.g., 0.9 or greater), then the sensitivity management engine 102 may determine that the metadata associated with the file 134 or the domain associated with the website that the file 134 is to be downloaded from matches the entry of sensitive keyword list 800 or the sensitive domain list 700, respectively.

In some implementations, if the file 134 is determined to be potentially sensitive based on the website that the file 134 was downloaded from, using the sensitive domain list 700, and the file is determined to include potentially sensitive keywords, using the sensitive keyword list 800, the "time to delete" entry 706, 806 that corresponds to the larger value may be applied to the file 134. Similarly, if more than one "sensitive keyword" entry 804 is determined to apply to the file 134, the "time to delete" entry 806 that corresponds to the larger value may be applied to the file 134.

FIG. 9 shows an example sensitive file observation list 900. As seen in FIG. 9, the sensitive file observation list 900 may include, for example, "entry id" entries 902, "file id" entries 904, "source id" entries 906, "last accessed" entries 908, and "time to delete" entries 910.

In some implementations, the "entry id" entries 902 may be unique identifiers assigned by the sensitivity management engine 102 for respective rows of entries in the sensitive file observation list 900.

In some implementations, the "file id" entries 904 may identify the name of the file that was downloaded to the first storage medium (e.g., the local storage of the client device 106) by the user 108.

In some implementations, the "source id" entries 906 may identify the domain associated with the website from which the file was downloaded.

In some implementations, the "last accessed" entries 908 may be timestamps generated by the sensitivity management engine 102 when the user 108 chooses to download the file to the first storage medium or when the file was last viewed and/or modified by the user 108.

In some implementations, the "time to delete" entries 910 may correspond amounts of time (e.g., hours, days, etc.) that files may exist on the first storage medium without being modified or deleted before the sensitivity management engine 102 may prompt the user 108 to take an action with respect to those file.

In some implementations, in response to the user 108 downloading the file 134 to the first storage medium, the sensitivity management engine 102 may add a new row of entries to the sensitive file observation list 900 by adding a new "entry id" entry 902, a new "file id" entry 904 corresponding to a name of the file 134, a new "source id" entry 906 corresponding to the domain associated with the website that the file 134 was downloaded from, a new "last accessed" entry 908 corresponding to a timestamp corresponding to when the file 134 was downloaded, and a new "time to delete" entry 910 corresponding to the corresponding "time to delete" entry 706, 806 (described above in connection with FIGS. 7 and 8) of the sensitive domain list 700 or the sensitive keyword list 800 that the sensitivity management engine 102 determined to match to the data/metadata (or domain) associated with the file 134.

In some implementations, the sensitivity management engine 102 may use the sensitive file observation list 900 to monitor the status of the file 134 stored in the first storage medium (e.g., the local storage of the client device 106). For example, the sensitivity management engine 102 may determine whether the file 134 has existed in the first storage medium for an amount of time (e.g., minutes, hours, days) that exceeds a threshold. In some implementations, the threshold may correspond to the "time to delete" entry 910 of the sensitive file observation list 900 corresponding to the file 134. For example, if the sensitivity management engine 102 determines that the difference between the "last accessed" entry 908 of the sensitive file observation list 900 corresponding to the file 134 and a timestamp corresponding to the current time corresponds to a value that is greater than or equal to the "time to delete" entry 910 of the sensitive file observation list 900, then the sensitivity management engine 102 may cause the display 109 of the client device 106 to present the prompt 186 to the user 108 requesting an action be taken with respect to the file 134 (as shown in FIG. 1F).

The sensitivity management engine 102 may update the entries of the sensitive file observation list 900 based on actions taken with respect to the file 134 while the file 134 exists in the first storage medium. For example, the sensitivity management engine 102 may access an application programming interface (API) to update the sensitive file observation list 900 at the sensitivity management service 103. In some implementations, the sensitivity management engine 102 may communicate with a local agent to determine if any actions were taken with respect to the file 134 (and any other potentially sensitive files listed in the sensitive file observation list 900). In some implementations, the local agent may be a local application installed on the client device 106. For example, the local agent may be an application associated with the second storage medium or the file sharing system 604. In some implementations, the sensitivity management engine 102 may communicate with the local agent using protocols associated with the web browser 124. For example, if the sensitivity management engine 102 is implemented in an extension for a Google Chrome web browser, then the sensitivity management engine 102 may leverage Google Chrome's native messaging protocol in order to communicate with the local agent, or the like. In some implementations, the local agent may keep a log of actions taken with respect to the file 134 while the file 134 exists on the first storage medium. For example, if the file 134 was viewed or modified by the user 108, the local agent may generate a timestamp corresponding to when the file 134 was viewed or modified. In some implementations, the local agent may store the timestamp and the action performed with respect to the file 134 in a file action table 1000 (as shown in FIG. 10). The local agent may send the file action table 1000 to the sensitivity management engine 102, which may update the corresponding entries of the sensitive file observation list 900 at the sensitivity management service 103.

In some implementations, the local agent may determine that the user 108 has taken an action with respect to the file 134 using event handlers. Such event handlers may be used, for example, to determine if an event associated with the viewing, modification, and/or deletion of the file 134 occurs. The local agent may receive an event notification from the event handler when the event associated with the file 134 occurs. The event notification may include information sent to the event handler in response to the event associated with the file 134 occurring. For example, the event notification may include information pertaining to the event that occurred and changes to the file 134 that resulted from the event. In some implementations, in response to receiving the event notification, the local agent may store a representation of the event and a timestamp generated at the time the local agent received the event notification in the file action table 1000 (as shown in FIG. 10). In some implementations, the sensitivity management engine 102 may send the sensitive file observation list 900 to the local agent, and the local agent may register for an event handler pertaining to each file listed in the sensitive file observation list 900.

In some implementations, when the web browser 124 is opened, the sensitivity management engine 102 may establish communications with the local agent and query the local agent for the file action table 1000. In some implementations, the sensitivity management engine 102 may use the information stored in the file action table 1000 to update the entries of the sensitive file observation list 900.

FIG. 10 shows an example file action table 1000 that may be generated and maintained by the local agent, and sent to the sensitivity management engine 102. In some implementations, the file action table 1000 may include "entry id" entries 1002, "file id" entries 1004, "file deleted indicator" entries 1006, and "timestamp" entries 1008.

In some implementations, the "entry id" entries 1002 may be unique identifiers assigned by the local agent for respective rows of entries in the file action table 1000.

In some implementations, the "file id" entries 1004 may identify the name of the file that was viewed, modified, or deleted by the user 108.

In some implementations, the "file deleted indicator" entries 1006 may indicate whether the action performed on the file by the user 108 resulted in the file being deleted.

In some implementations, the "timestamp" entries 1008 may be the timestamp generated by the local agent when the local agent received the event notification that the user 108 had performed an action with respect to the corresponding file.

As mentioned above, in some implementations, when the web browser 124 is opened, the sensitivity management engine 102 may establish communications with the local agent and query the local agent for the file action table 1000. In some implementations, the sensitivity management engine 102 may use the information stored in the file action table 1000 to update the entries of the sensitive file observation list 900. For example, if the sensitivity management engine 102 determines from the file action table 1000 that the file 134 was deleted (i.e., that the "file deleted indicator" entry 1006 for the file 134 corresponded to "true," or the like), the sensitivity management engine 102 may delete the row of entries corresponding to the file 134 from the sensitive file observation list 900. For further example, if the sensitivity management engine 102 determines from the file action table 1000 that the file 134 was viewed and/or modified (i.e., that a "file id" entry 1004 corresponds to the file 134), the sensitivity management engine 102 may update the "last accessed" entry 908 of the sensitive file observation list 900 corresponding to the file 134 to include the timestamp included in the "timestamp" entry 1008 of the row of entries of file action table 1000 corresponding to the file 134.

The sensitivity management engine 102 may determine, after updating the sensitive file observation list 900 based on the file action table 1000, whether the difference between the "last accessed" entry 908 of the sensitive file observation list corresponding to the file 134 and a timestamp corresponding to the current time of the client device 106 is greater than or equal to the "time to delete" entry 910 of the sensitive file observation list 900 corresponding to the file. If such a determination is made, then the sensitivity management engine 102 may cause the display 109 of the client device 106 to present the prompt 186 (shown in FIG. 1F). In some implementations, the local agent may cause the display 109 of the client device 106 to present the prompt 186. Further, in some implementations, in response to uploading the file 134 to the second storage medium and/or deleting the file 134 from the first storage medium, the local agent may add an entry to the file action table 1000 corresponding to the file 134 which indicates that the file 134 was deleted.

In some implementations, the sensitivity management engine 102 may detect that the user 108 is attempting to download a file using a command prompt terminal for the operating system of the client device 106. For example, the sensitivity management engine 102 may be in communication with the local agent which may detect that the user 108 has requested a download of a file using the command prompt terminal. In some implementations, the local agent may include the same capabilities as those of the sensitivity management engine 102 described above. The local agent may register for event handlers associated with attempts to download a file using the command prompt terminal of the operating system. For example, the local agent may register for an event handler associated with the user 108 opening the command prompt terminal. For further example, the local agent may register for an event handler associated with specific download commands, such that, when the user enters the command to download the file (e.g., wget, curl, Invoke-WebRequest, or the like, the link to the file, and any necessary login credentials) into the command prompt terminal, the local agent may receive an event notification including the link to the file and the login credentials. In some implementations, the local agent may determine whether the file to be downloaded is potentially sensitive using the sensitivity criteria 111, which the local agent may receive from the sensitivity management engine 102 or the sensitivity management service 103. If the file is determined to be potentially sensitive, and the user 108 declines the option to store the file in the second storage medium and instead opts to download the file locally to the user's 108 client device 106, then the local agent may add an entry to the file action table 1000 corresponding to the file and may send the file action table 1000 to the sensitivity management engine 102 the next time that the web browser 124 is executed. Alternatively, the local agent may update the sensitive file observation list 900 using the corresponding API. If, instead, the user accepts the option to store the file in the second storage medium, then the local agent may perform the steps discussed above to initiate the process to download the file to the second storage medium.

In some implementations, the sensitivity management engine 102 may detect that the user 108 is attempting to download a file from a network drive of the client device 106. For example, the sensitivity management engine 102 may be in communication with the local agent which may detect that the user 108 has attempted to download the file from the network drive. The local agent may register for event handlers associated with attempts to download the file from the network drive. For example, the local agent may register for an event handler associated with the user 108 opening the network drive. For further example, the local agent may register for an event handler associated with the user 108 attempting to download the file (rather than, for example, view the file) while within the network drive. If the local agent determines that the file is potentially sensitive, and the user 108 declines the option to store the file in the second storage medium and instead opts to download the file locally to the user's 108 client device 106, then the local agent may add an entry to the file action table 1000 corresponding to the file and may send the file action table 1000 to the sensitivity management engine 102 the next time that the web browser 124 is executed. Alternatively, the local agent may update the sensitive file observation list 900 using the corresponding API. If, instead, the user 108 accepts the option to store the file in the second storage medium, then the local agent may perform the steps discussed above to initiate the process to download the file to the second storage medium.

Figure 11:
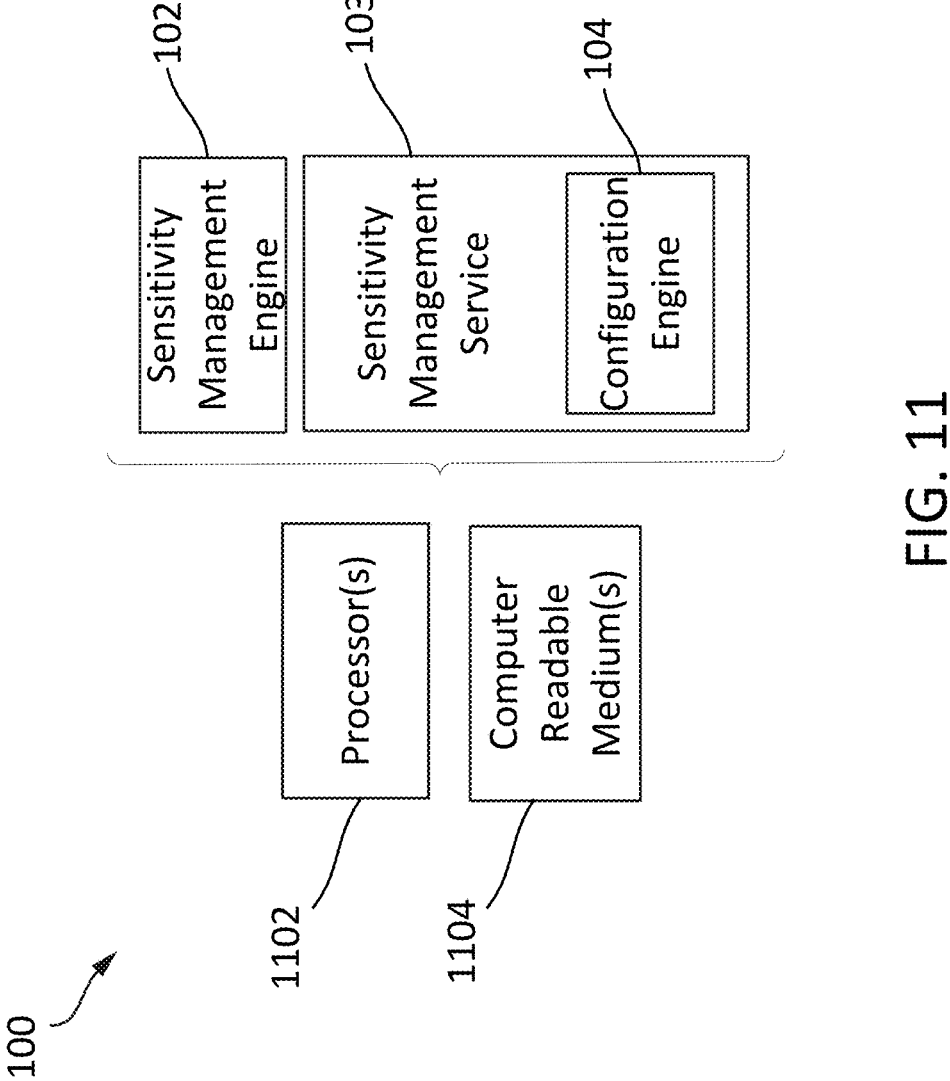
FIG. 11 shows an example implementation of certain components of the system shown in FIG. 1A.

FIG. 11 shows example components that may be included in the system 100. As shown in FIG. 11, in some implementations, the system 100 may include one or more processors 1102 and one or more computer readable mediums 1104 that may be encoded with instructions which, when executed by the processor(s) 1102 may implement the functionality of the sensitivity management engine 102 (described above) as well as the sensitivity management service 103 (described above). In some implementations, the sensitivity management service 103 may include a configuration engine 104 (described below). As explained in more detail below, in some implementations, the configuration engine 104 may be used to set and/or update the entries of the sensitive domain list 700 and the sensitive keyword list 800 based on input provided by a system administrator and/or the user 108, etc.

Figure 12:
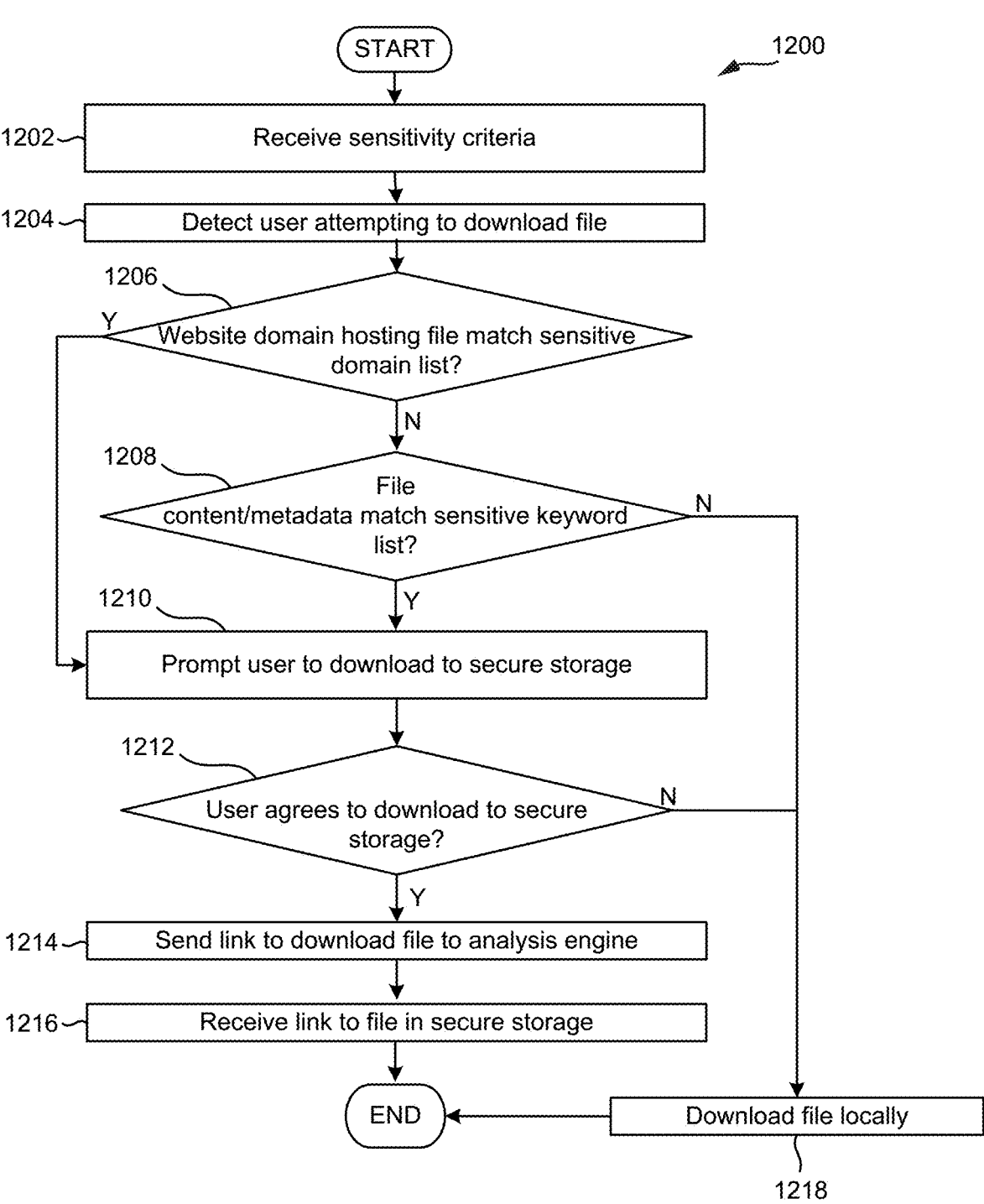
FIG. 12 shows an example routine that may be executed by the sensitivity management engine shown in FIGS. 1A and 11 to enable secure storage and maintenance of potentially sensitive file downloads in accordance with some embodiments.
Figure 13:
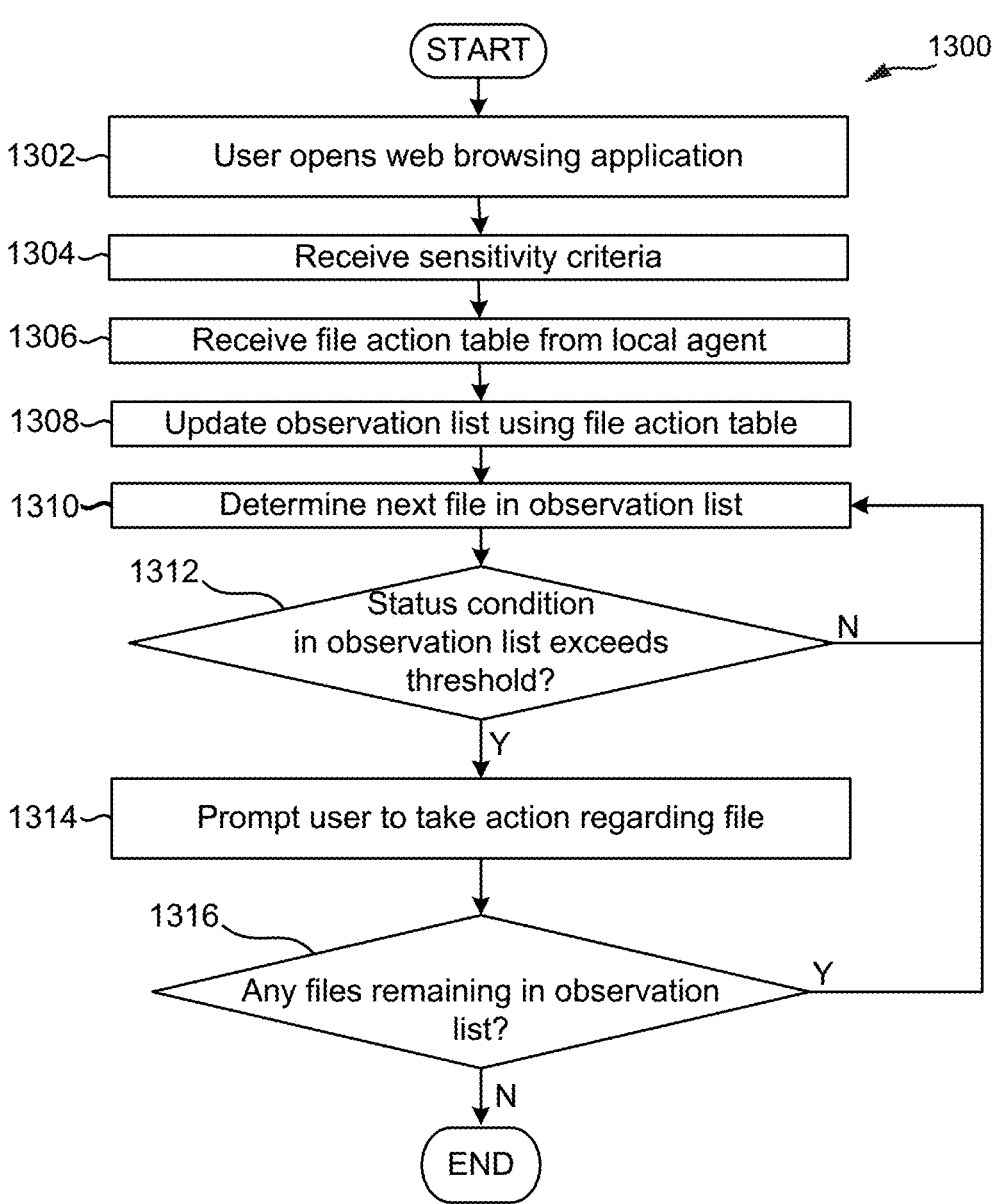
FIG. 13 shows an example routine that may be executed by the sensitivity management engine shown in FIGS. 1A and 11 to enable secure storage and maintenance of potentially sensitive file downloads in accordance with some embodiments.

FIGS. 12 and 13 show, respectively, a first example routine 1200 and a second example routine 1300 that may be performed by the sensitivity management engine 102. As explained in more detail below, the first routine 1200 may be responsible for detecting that a user is attempting to download a potentially sensitive file to a first storage medium and prompting the user to download the potentially sensitive file to a second storage medium instead of the first storage medium. The second routine 1300, on the other hand, may be responsible for monitoring files that the user has decided to download to the first storage medium instead of the second storage medium.

As shown in FIG. 12, the routine 1200 may begin at a step 1202, when the sensitivity management engine 102 receives sensitivity criteria 111. As discussed above, the sensitivity management engine 102 may receive the sensitivity criteria 111 from a sensitivity management service 103 when a web browser which implements the sensitivity management engine 102 is executed.

At a step 1204 of the routine 1200, the sensitivity management engine 102 may detect that the user 108 is attempting to download a file 134. The sensitivity management engine 102 may, for example, receive an event notification from an event handler representing that the user 108 has executed a download of the file 134.

At a decision 1206, the sensitivity management engine 102 may determine whether a website domain hosting the file 134 that the user 108 is attempting to download matches a sensitive domain list 700. The sensitivity management engine 102 may, for example, determine whether the website domain hosting the file 134 matches an entry of the sensitive domain list 700 using a cosine similarity algorithm.

When, at the decision 1206, the sensitivity management engine 102 determines that the website domain hosting the file 134 matches an entry of the sensitive domain list 700, then the routine 1200 may proceed to a step 1210, where the sensitivity management engine 102 may prompt the user 108 to agree to download the file 134 to a secure storage (i.e., the second storage medium) instead of locally (i.e., the first storage medium). When, on the other hand, the sensitivity management engine 102 determines that the website domain hosting the file 134 does not match any entry of the sensitive domain list 700, the routine 1200 may proceed to a decision 1208, where the sensitivity management engine 102 may determine whether file content/metadata corresponding to the file 134 matches a sensitive keyword list 800. The sensitivity management engine 102 may, for example, determine whether the file content/metadata corresponding to the file 134 matches an entry of the sensitive keyword list 800 using the cosine similarity algorithm.

When, at the decision 1208, the sensitivity management engine 102 determines that the file content/metadata corresponding to the file 134 does not match any entry of the sensitive keyword list 800, the routine 1200 may proceed to a step 1218, where the sensitivity management engine 102 may allow the user 108 to download the file 134 locally (i.e., to the first storage medium). When, on the hand, the sensitivity management engine 102 determines that the file content/metadata corresponding to the file 134 matches an entry of the sensitive keyword list 800, the routine 1200 may proceed to a step 1210, where the sensitivity management engine 102 may prompt the user 108 with an option to download the file 134 to the secure storage (i.e., the second storage medium) instead of locally (i.e., the first storage medium).

At a decision 1212, the sensitivity management engine 102 may determine whether the user 108 has agreed to download the file 134 to the secure storage (i.e., the second storage medium) instead of locally (i.e., the first storage medium). For example, the sensitivity management engine 102 may receive an event notification from an event handler representing that the user 108 has selected a "yes" button 144 or a "no" button 142.

When, at the decision 1212, the sensitivity management engine 102 determines that the user 108 has not agreed (e.g., has selected the "no" button 142) to download the file 134 to the secure storage (i.e., the second storage medium), the routine 1200 may proceed to a step 1218, where the sensitivity management engine 102 may allow the user 108 to download the file 134 locally (i.e., to the first storage medium). In some implementations, in response to determining that the user 108 has not agreed to download the file 134 to the secure storage, the sensitivity management engine 102 may add an entry to a sensitive file observation list 900 corresponding to the file 134. When, on the other hand, sensitivity management engine 102 determines that the user 108 has agreed (e.g., has selected the "yes" button 144) to download the file 134 to the secure storage (i.e., the second storage medium) instead of locally (i.e., the first storage medium), the routine 1200 may proceed to a step 1214, where the sensitivity management engine 102 may send a link to the download location of the file 134 to the sensitivity management service 103. The sensitivity management engine 102 may, for example, generate a microapp action including the link and send the microapp action to a microapp service 528 of the sensitivity management service 103.

At a step 1216 of the routine 1200, the sensitivity management engine 102 may receive a link 115 to the file 134 in the secure storage (i.e., the second storage medium). In some implementations, the sensitivity management engine 102 may receive the link 115 from a microapp of the sensitivity management service 103. The routine 1200 may then terminate.

As shown in FIG. 13, the routine 1300 may begin at a step 1302, when a user 108 opens a web browsing application. In some implementations, the web browser may include a browser extension which implements the sensitivity management engine 102.

At a step 1304 of the routine 1300, the sensitivity management engine 102 may receive sensitivity criteria 111. As stated above in connection with FIG. 12, the sensitivity management engine 102 may receive the sensitivity criteria 111 from the sensitivity management service 103 when the web browser which implements the sensitivity management engine 102 is executed.

At a step 1306 of the routine 1300, the sensitivity management engine 102 may receive a file action table 1000 from a local agent. In some implementations, the local agent may be an application executing locally (i.e., to the first storage medium). The file action table 1000 may include entries corresponding to potentially sensitive files that the user 108 chose to download locally (i.e., to the first storage medium), actions that the user has taken with respect to the potentially sensitive files, and timestamps corresponding to when such actions were taken.

At a step 1308 of the routine 1300, the sensitivity management engine 102 may update a sensitive file observation list 900 using the file action table 1000. The sensitive file observation list 900 may include entries corresponding to potentially sensitive files that the user 108 chose to download locally. The sensitivity management engine 102 may, for example, update a row of the sensitive file observation list 900 corresponding to a file listed in the file action table 1000 by replacing a "last accessed" entry 908 of the file observation list 900 with the timestamp from the file action table 1000 for the corresponding file.

At a step 1310 of the routine 1300, the sensitivity management engine 102 may determine the next file in the sensitive file observation list 900.

At the decision 1312, the sensitivity management engine 102 may determine whether a status condition for the file exceeds a threshold. For example, the sensitivity management engine 102 may determine whether a difference between the "last accessed" entry 908 for the current row of the sensitive file observation list 900 and the current time meets or exceeds the amount of time listed in the "time to delete" entry 910 for the current row of the sensitive file observation list 900.

When, at the decision 1312, the sensitivity management engine 102 determines that the file status condition for the current row of the sensitive file observation list 900 does not meet or exceed the threshold, the routine 1300 may return to a step 1310. When, on the other hand, the sensitivity management engine 102 determines that the file status condition for the current row of the file observation list 900 does meet or exceed the threshold, the routine may proceed to a step 1314, where the sensitivity management engine 102 may prompt the user 108 to take action with respect to the corresponding file of the current row of the file observation list 900. For example, the sensitivity management engine 102 may cause the display 109 of the client device 106 to present a prompt 186 informing the user 108 that the user 108 has not taken an action with respect to the file for an amount of time.

At a decision 1316, the sensitivity management engine 102 may determine whether there are any files remaining in the sensitive file observation list 900 that have not been processed by the sensitivity management engine 102.

Figure 14:
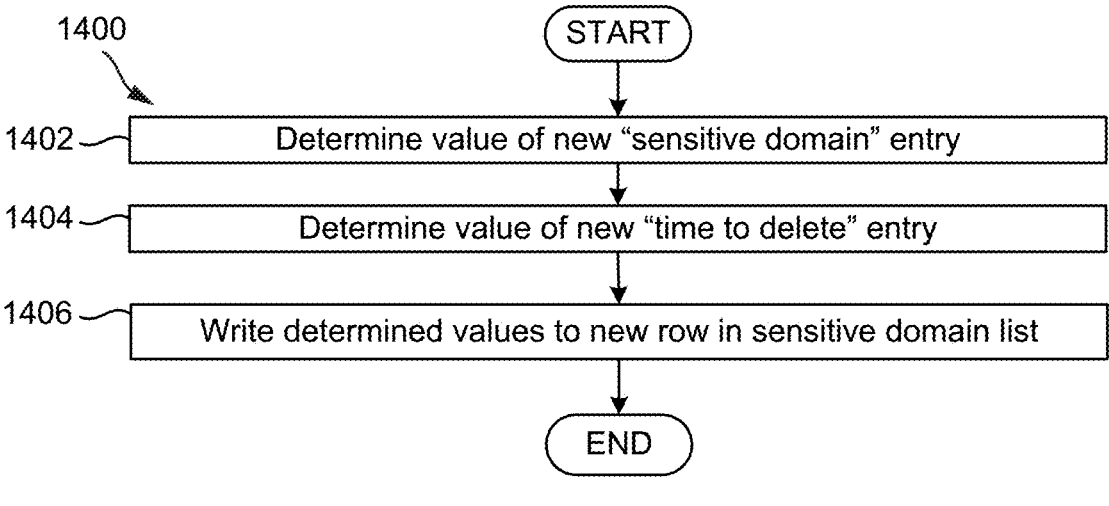
FIG. 14 shows an example routine that may be executed by the configuration engine shown in FIGS. 1A and 11 in accordance with some embodiments.
Figure 15:
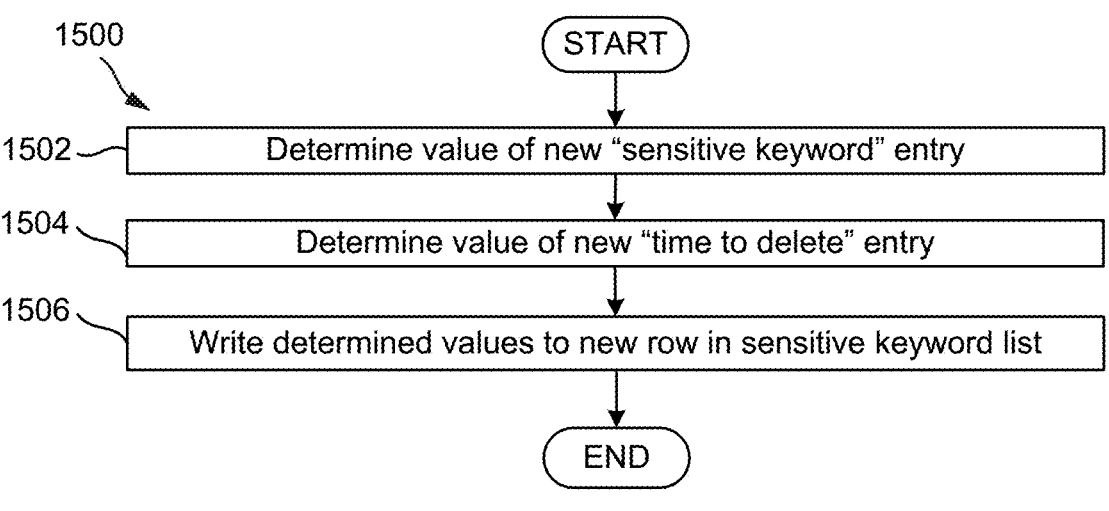
FIG. 15 shows an example routine that may be executed by the configuration engine shown in FIGS. 1A and 11 in accordance with some embodiments.

When, at the decision 1316, the sensitivity management engine 102 determines that there are files remaining in the sensitive file observation list 900 that have not been processed by the sensitivity management engine 102, the routine 1300 may return to the step 1310. When, on the other hand, the sensitivity management engine 102 determines that there are not any files remaining in the sensitive file observation list 900 that have not been processed by the sensitivity management engine 102, the routine 1300 may terminate FIGS. 14 and 15 show, respectively, a first example routine 1400 and a second example routine 1500 that may be performed by the configuration engine 104 of the sensitivity management service 103 (shown in FIG. 11). As described in more detail below, the first routine 1400 may be responsible for adding entries to the sensitive domain list 700, e.g., in response to input by a system administrator, the user 108, etc. The second routine 1500, on the other hand, may be responsible for adding entries to the sensitive keyword list 800, e.g., in response to input by a system administrator, the user 108, etc. For example, the configuration engine 104 (or the sensitivity management service 103) may allow the user 108 to access a "user preferences" window or the like, that steps the user 108 through the process of specifying entries/values to add to the sensitive domain list 700 or the sensitive keyword list 800, thus allowing the user 108 to customize which kind of information the sensitivity management engine 102 may use to determine that a file is potentially sensitive. In some implementations, the configuration engine 104 may additionally or alternatively present the user 108 with one or more options for disabling the sensitivity management engine 102 from prompting the user 108 with respect to files determined to be potentially sensitive and/or files determined to exist in the first storage medium for an amount of time without being viewed and/or modified.

As shown in FIG. 14, the routine 1400 may begin at a step 1402, at which the configuration engine 104 may determine a value of a new "sensitive domain" entry 704, e.g., as specified by the system administrator, the user 108, etc.

At a step 1404 of the routine 1400, the configuration engine 104 may determine a value of a new "time to delete" entry 706, e.g., as specified by the system administrator, the user 108, etc.

At a step 1406 of the routine 1400, the configuration engine 104 may write the values determined at steps 1402 and 1404 as a new row to the sensitive domain list 700. As noted above, in some implementations, such newly-added row may be indexed by a unique "entry id" entry 702, so as to differentiate it from the other rows of the sensitive domain list 700.

As shown in FIG. 15, the routine 1500 may begin at a step 1502, at which the configuration engine 104 may determine a value of a new "sensitive keyword" entry 804, e.g., as specified by the system administrator, the user 108, etc.

At a step 1504 of the routine 1500, the configuration engine 104 may determine a value of a new "time to delete" entry 806, e.g., as specified by the system administrator, the user 108, etc.

At a step 1506 of the routine 1500, the configuration engine 104 may write the values determined at steps 1502 and 1504 as a new row to the sensitive keyword list 800. As noted above, in some implementations, such newly added row may be indexed by a unique "entry id" entry 802, so as to differentiate it from the other rows of the sensitive keyword list 800.

H. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves detecting a first request to download a first file, via a network, to a first storage medium associated with a client device;

determining that the first file is potentially sensitive; and based at least in part on the first file being potentially sensitive, initiating a process to download the first file to a second storage medium rather than the first storage medium.

(M2) A method may be performed as described in paragraph (M1), wherein initiating the process to download the first file to the second storage medium may involve causing the client device to present a prompt requesting authorization to download the first file to the second storage medium, and the method may further involve determining that a user input authorizing downloading of the first file to the send storage medium has been received; and causing, based at least in part on the receipt of the user input, the first file to be downloaded to the second storage medium rather than the first storage medium.

(M3) A method may be performed as described in paragraph (M1) or paragraph (M2), wherein the first file may be determined to be potentially sensitive based at least in part on a web domain from which the first file is to be downloaded.

(M4) A method may be performed as described in any of paragraphs (M1) through (M3), wherein the first file may be determined to be potentially sensitive based at least in part on metadata associated with the first file.

(M5) A method may be performed as described in any of paragraphs (M1) through (M4), wherein the first file may be determined to be potentially sensitive based at least in part on content of the first file.

(M6) A method may be performed as described in any of paragraphs (M1) through (M5), and may further involve detecting a second request to download a second file, via the network, to the first storage medium associated with the client device; determining that the second file is unlikely to be sensitive; and based at least in part on the second file being unlikely to be sensitive, initiating a process to download the second file to the first storage medium.

(M7) A method may be performed as described in paragraph (M6), and may further involve downloading the second file to the first storage medium; determining that an amount of time that has elapsed since the second file on the first storage medium has been access exceeds a threshold; and based at least in part on the amount of time exceeding the threshold, causing the client device to present a first prompt.

(M8) A method may be performed as described in any of paragraphs (M1) through (M7), wherein initiating the process to download the first file to the second storage medium may involve sending a hyperlink to a remote application that is configured to use the hyperlink to download the first file to the second storage medium.

(M9) A method may be performed as described in paragraph (M8), wherein the remote application may be further configured to use access credentials associated with a user of the client device to authenticate to the second storage medium to enable secure storage of the first file in the second storage medium.

The following paragraphs (S1) through (S9) describe examples of systems and devices that may be implemented in accordance with the present disclosure.

(S1) A computing system may include at least one processor, and at least one computer-readable medium encoded with instructions which, when executed by the at least one processor, cause the computing system to detect a first request to download a first file, via a network, to a first storage medium associated with a client device, to determine that the first file is potentially sensitive, and to initiate a process to download the first file to a second storage medium rather than the first storage medium based at least in part on the first file being potentially sensitive.

(S2) A computing system may be configured as described in paragraph (S1), wherein the at least one computer-readable medium may be further encoded with additional instructions which, when executed by the at least one processor, further cause the computing system to initiate the process to download the first file to the second storage medium at least in part by causing the client device to present a prompt request authorization to download the first file to the second storage medium, determining that a user input authoring downloading of the first file to the second storage medium has been received, and causing, based at least in part on the receipt of the user input, the first file to be downloaded to the second storage medium rather than the first storage medium.

(S3) A computing system may be configured as described in paragraph (S1) or paragraph (S2), wherein the first file may be determined to be potentially sensitive based at least in part on a web domain from which the first file is to be downloaded.

(S4) A computing system may be configured as described in any of paragraphs (S1) through (S3), wherein the first file may be determined to be potentially sensitive based at least in part on metadata associated with the first file.

(S5) A computing system may be configured as described in any of paragraphs (S1) through (S4), wherein the first file may be determined to be potentially sensitive based at least in part on content of the first file.

(S6) A computing system may be configured as described in any of paragraphs (S1) through (S5), wherein the at least one computer-readable medium may be further encoded with additional instructions which, when executed by the at least one processor, further cause the computing system to detect a second request to download a second file, via the network, to the first storage medium associated with the client device, to determine that the second file is unlikely to be sensitive, and to initiate a process to download the second file to the first storage medium based at least in part on the second file being unlikely to be sensitive.

(S7) A computing system may be configured as described in paragraph (S6), wherein the at least one computer-readable medium may be further encoded with additional instructions which, when executed by the at least one processor, further cause the computing system to download the second file to the first storage medium, to determine that an amount of time that has elapsed since the second file on the first storage medium has been accessed exceeds a threshold, and to cause the client device to present a prompt based at least in part on the amount of time exceeding the threshold.

(S8) A computing system may be configured as described in any of paragraphs (S1) through (S7), wherein the at least one computer-readable medium may be further encoded with additional instructions which, when executed by the at least one processor, further cause the computing system to initiate the process to download the first file to the second storage medium at least in part by sending a hyperlink to a remote application that is configured to use the hyperlink to download the first file to the second storage medium.

(S9) A computing system may be configured as described in paragraph (S8), wherein the remote application may be configured to use access credentials associated with a user of the client device to authenticate to the second storage medium to enable secure storage of the first file in the second storage medium.

The following paragraphs (CRM1) through (CRM9) describe examples of computer-readable media that may be implemented in accordance with the present disclosure.

(CRM1) At least one non-transitory computer-readable medium may be encoded with instructions which, when executed by the at least one processor of a computing system, cause the computing system to detect a first request to download a first file, via a network, to a first storage medium associated with a client device, to determine that the first file is potentially sensitive, and to initiate a process to download the first file to a second storage medium rather than the first storage medium based at least in part on the first file being potentially sensitive.

(CRM2) At least one non-transitory computer-readable medium may be configured as described in paragraph (CRM1), and may be further encoded with additional instructions which, when executed by the at least one processor, further cause the computing system to initiate the process to download the first file to the second storage medium at least in part by causing the client device to present a prompt request authorization to download the first file to the second storage medium, determining that a user input authoring downloading of the first file to the second storage medium has been received, and causing, based at least in part on the receipt of the user input, the first file to be downloaded to the second storage medium rather than the first storage medium.

(CRM3) At least one non-transitory computer-readable medium may be configured as described in paragraph (CRM1) or paragraph (CRM2), wherein the first file may be determined to be potentially sensitive based at least in part on a web domain from which the first file is to be downloaded.

(CRM4) At least one non-transitory computer-readable medium may be configured as described in any of paragraphs (CRM1) through (CRM3), wherein the first file may be determined to be potentially sensitive based at least in part on metadata associated with the first file.

(CRM5) At least one non-transitory computer-readable medium may be configured as described in any of paragraphs (CRM1) through (CRM4), wherein the first file may be determined to be potentially sensitive based at least in part on content of the first file.

(CRM6) At least one non-transitory computer-readable medium may be configured as described in any of paragraphs (CRM1) through (CRM5), and may be further encoded with additional instructions which, when executed by the at least one processor, further cause the computing system to detect a second request to download a second file, via the network, to the first storage medium associated with the client device, to determine that the second file is unlikely to be sensitive, and to initiate a process to download the second file to the first storage medium based at least in part on the second file being unlikely to be sensitive.

(CRM7) At least one non-transitory computer-readable medium may be configured as described in paragraph (CRM6), and may be further encoded with additional instructions which, when executed by the at least one processor, further cause the computing system to download the second file to the first storage medium, to determine that an amount of time that has elapsed since the second file on the first storage medium has been accessed exceeds a threshold, and to cause the client device to present a prompt based at least in part on the amount of time exceeding the threshold.

(CRM8) At least one non-transitory computer-readable medium may be configured as described in any of paragraphs (CRM1) through (CRM7), and may be further encoded with additional instructions which, when executed by the at least one processor, further cause the computing system to initiate the process to download the first file to the second storage medium at least in part by sending a hyperlink to a remote application that is configured to use the hyperlink to download the first file to the second storage medium.

(CRM9) At least one non-transitory computer-readable medium may be configured as described in paragraph (CRM8), wherein the remote application may be configured to use access credentials associated with a user of the client device to authenticate to the second storage medium to enable secure storage of the first file in the second storage medium.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
detecting, by a client device, a first request to download a first file, via a network, to a first storage medium associated with the client device;
determining, by the client device, that the first file is potentially sensitive, based at least in part on sensitivity criteria applied to the first request and the first file; and
based at least in part on the first file being potentially sensitive, initiating, by the client device, a process to download the first file to a second storage medium rather than the first storage medium.

2. The method of claim 1, wherein initiating the process to download the first file to the second storage medium comprises:
causing the client device to present a prompt requesting authorization to download the first file to the second storage medium, and the method further comprises:
determining that a user input authorizing downloading of the first file to the second storage medium has been received; and
causing, based at least in part on the receipt of the user input, the first file to be downloaded to the second storage medium rather than the first storage medium.

3. The method of claim 1, wherein the first file is determined to be potentially sensitive based at least in part on a web domain from which the first file is to be downloaded.

4. The method of claim 1, wherein the first file is determined to be potentially sensitive based at least in part on metadata associated with the first file.

5. The method of claim 1, wherein the first file is determined to be potentially sensitive based at least in part on content of the first file.

6. The method of claim 1, further comprising:
detecting a second request to download a second file, via the network, to the first storage medium associated with the client device;
determining that the second file is unlikely to be sensitive; and
based at least in part on the second file being unlikely to be sensitive, initiating a process to download the second file to the first storage medium.

7. The method of claim 6, further comprising:
downloading the second file to the first storage medium;
determining that an amount of time that has elapsed since the second file on the first storage medium has been accessed exceeds a threshold; and
based at least in part on the amount of time exceeding the threshold, causing the client device to present a first prompt.

8. The method of claim 1, wherein initiating the process to download the first file to the second storage medium further comprises:
sending a hyperlink to a remote application that is configured to use the hyperlink to download the first file to the second storage medium.

9. The method of claim 8, wherein the remote application is further configured to use access credentials associated with a user of the client device to authenticate to the second storage medium to enable secure storage of the first file in the second storage medium.

10. A computing system of a client device, the computing system comprising:
at least one processor; and
at least one computer-readable medium encoded with instructions which, when executed by the at least one processor, cause the computing system to:

detect a first request to download a first file, via a network, to a first storage medium associated with the client device;

determine that the first file is potentially sensitive, based at least in part on sensitivity criteria applied to the first request and the first file; and based at least in part on the first file being potentially sensitive, initiate a process to download the first file to a second storage medium rather than the first storage medium.

11. The computing system of claim 10, wherein the at least one computer-readable medium is further encoded with additional instructions which, when executed by the at least one processor, further cause the computing system to cause the computing system to initiate the process to download the first file to the second storage medium at least in part by:

causing the client device to present a prompt requesting authorization to download the first file to the second storage medium;

determining that a user input authorizing downloading of the first file to the second storage medium has been received; and causing, based at least in part on the receipt of the user input, the first file to be downloaded to the second storage medium rather than the first storage medium.

12. The computing system of claim 10, wherein the first file is determined to be potentially sensitive based at least in part on a web domain from which the first file is to be downloaded.

13. The computing system of claim 10, wherein the first file is determined to be potentially sensitive based at least in part on metadata associated with the first file.

14. The computing system of claim 10, wherein the first file is determined to be potentially sensitive based at least in part on content of the first file.

15. The computing system of claim 10, wherein the at least one computer-readable medium is further encoded with additional instructions which, when executed by the at least one processor, further cause the computing system to:

detect a second request to download a second file, via the network, to the first storage medium associated with the client device;

determine that the second file is unlikely to be sensitive; and based at least in part on the second file being unlikely to be sensitive, initiate a process to download the second file to the first storage medium.

16. The computing system of claim 15, wherein the at least one computer-readable medium is further encoded with additional instructions which, when executed by the at least one processor, further cause the computing system to:

download the second file to the first storage medium;

determine that an amount of time that has elapsed since the second file on the first storage medium has been accessed exceeds a threshold; and based at least in part on the amount of time exceeding the threshold, cause the client device to present a first prompt.

17. The computing system of claim 10, wherein the at least one computer-readable medium is further encoded with additional instructions which, when executed by the at least one processor, further cause the computing system to initiate the process to download the first file to the second storage medium at least in part by:

sending a hyperlink to a remote application that is configured to use the hyperlink to download the first file to the second storage medium.

18. The computing system of claim 17, wherein the remote application is further configured to use access credentials associated with a user of the client device to authenticate to the second storage medium to enable secure storage of the first file in the second storage medium.

19. At least one non-transitory computer-readable medium encoded with instructions which, when executed by at least one processor of a client device, cause the client device to:

detect a first request to download a first file, via a network, to a first storage medium associated with the client device;

determine that the first file is potentially sensitive, based at least in part on sensitivity criteria applied to the first request and the first file; and based at least in part on the first file being potentially sensitive, initiate a process to download the first file to a second storage medium rather than the first storage medium.

20. The at least one non-transitory computer-readable medium of claim 19, wherein the at least one computer-readable medium is further encoded with additional instructions which, when executed by the at least one processor, further cause the client device to initiate the process to download the first file to the second storage medium at least in part by:

causing the client device to present a prompt requesting authorization to download the first file to the second storage medium;

determining that a user input authorizing downloading of the first file to the second storage medium has been received; and causing, based at least in part on the receipt of the user input, the first file to be downloaded to the second storage medium rather than the first storage medium.

* * * * *